United States Patent [19]

Grajski et al.

[11] Patent Number: 5,577,135
[45] Date of Patent: Nov. 19, 1996

[54] HANDWRITING SIGNAL PROCESSING FRONT-END FOR HANDWRITING RECOGNIZERS

[75] Inventors: Kamil A. Grajski, San Jose; Yen-Lu Chow; Kai-Fu Lee, both of Saratoga, all of Calif.

[73] Assignee: Apple Computer, Inc., Cupertino, Calif.

[21] Appl. No.: 204,031

[22] Filed: Mar. 1, 1994

[51] Int. Cl.⁶ .............................. G06K 9/36; G06K 9/00
[52] U.S. Cl. .......................................... 382/253; 382/187
[58] Field of Search ................................ 382/13, 21, 56, 382/253, 179, 187; 348/417, 414, 418; 395/2.54, 2.65, 2.62, 2

[56] References Cited

U.S. PATENT DOCUMENTS

| | | | |
|---|---|---|---|
| 4,597,101 | 6/1986 | Kishimoto et al. | 382/13 |
| 5,136,663 | 8/1992 | Nishio | 382/56 |
| 5,202,926 | 4/1993 | Miki | 381/36 |
| 5,226,091 | 7/1993 | Howell et al. | 382/3 |
| 5,255,090 | 10/1993 | Israelsen | 348/417 |
| 5,343,537 | 8/1994 | Bellegarda | 382/30 |

OTHER PUBLICATIONS

David E. Rumelhart, Theory to Practice: A Case Study—Recognizing Cursive Handwriting, preprint, p. 1–20 (1993).
Kundu, Amlan and Bahl, Paramrir, "Recognition of Handwritten Script: A Hidden Markov Model Based Approach", IEEE, NY, 1988.
Furvi, Sadaoki, "A VQ–Based Preprocessor Using Cepstral Dynamic Features for Speaker–Independent Large Vocabulary Word Recognition," IEEE, 1988.
Class, F., Kaltemeier, A., and Regel, P., "Soft–Decision Vector Quentization Based in the Dempster / Shafer theory", IEEE, 1991.
Constantinescu et al., "On–line Adaptive Vector Quantization with Variable Size Codebook Entries", IEEE, 1993, pp. 32–41.
Andrews et al., "A Mean–Removed Variation of Weighted Universal Vector Quantization for Image Coding", IEEE, 1993, pp. 302–308.
HO, Tin Kam, "Recognition of Handwritten Digits by Combining Independent Learning Vector Quantization", IEEE, 1993, pp. 818–821.

*Primary Examiner*—Jose L. Couso
*Assistant Examiner*—Matthew C. Bella
*Attorney, Agent, or Firm*—Benman Collins & Sawyer

[57] ABSTRACT

A handwriting signal processing front-end method and apparatus for a handwriting training and recognition system which includes non-uniform segmentation and feature extraction in combination with multiple vector quantization. In a training phase, digitized handwriting samples are partitioned into segments of unequal length. Features are extracted from the segments and are grouped to form feature vectors for each segment. Groups of adjacent from feature vectors are then combined to form input frames. Feature-specific vectors are formed by grouping features of the same type from each of the feature vectors within a frame. Multiple vector quantization is then performed on each feature-specific vector to statistically model the distributions of the vectors for each feature by identifying clusters of the vectors and determining the mean locations of the vectors in the clusters. Each mean location is represented by a codebook symbol and this information is stored in a codebook for each feature. These codebooks are then used to train a recognition system. In the testing phase, where the recognition system is to identify handwriting, digitized test handwriting is first processed as in the training phase to generate feature-specific vectors from input frames. Multiple vector quantization is then performed on each feature-specific vector to represent the feature-specific vector using the codebook symbols that were generated for that feature during training. The resulting series of codebook symbols effects a reduced representation of the sampled handwriting data and is used for subsequent handwriting recognition.

14 Claims, 13 Drawing Sheets

|  | FRAME 1<br>N,N,1 | FRAME 2<br>N,1,2 | FRAME 3<br>1,2,3 | FRAME 4<br>2,3,4 | FRAME 5<br>3,4,5 | FRAME 6<br>4,5,N | FRAME 7<br>5,N,N |
|---|---|---|---|---|---|---|---|
| CODEBOOK I | 24 | 99 | 208 | 123 | 31 | 87 | 241 |
| CODEBOOK II | 111 | 200 | 1 | 67 | 248 | 122 | 109 |
| CODEBOOK III | 41 | 78 | 217 | 20 | 56 | 49 | 9 |
| CODEBOOK IV | 6 | 84 | 90 | 256 | 102 | 42 | 26 |
| ⋮ | ⋯ | ⋯ | ⋯ | ⋯ | ⋯ | ⋯ | ⋯ |
| CODEBOOK n | 154 | 231 | 202 | 223 | 145 | 188 | 244 |

FIGURE 13

HANDWRITING SIGNAL PROCESSING FRONT-END FOR HANDWRITING RECOGNIZERS

BACKGROUND OF THE INVENTION

The present invention relates generally to front-end processing and storage of handwriting data in handwriting training and recognition systems, and more particularly to a handwriting signal processing front-end that utilizes non-uniform segmentation, feature exaction and multiple vector quantization.

Today, the use of pen-based computer systems that allow a user to interface with the computer through a pen rather than a keyboard are becoming widespread. A common type of a pen-based computer system, for example, is a hand-held personal computer called a personal digital assistant (PDA). Typically, a PDA comes equipped with a specialized writing pen. As shown in FIG. 1, a user interfaces with a pen-based computer 1 by writing on a digitizing tablet 3 using a special stylus or pen 5. When the pen 5 is placed near or on the digitizing tablet 3, the tablet 3 generates a series of x- and y-coordinates, called sample points, that represent the path of the pen 5 as it moves across the tablet 3. FIG. 2 is a graphical example of sample points for a cursive handwriting sample that was written on a pen-based computer. The stars in FIG. 2 indicate sample points of the (x,y) coordinates of the pen taken at uniform time intervals, and the units on the x and y axis on the graph represent actual addresses on the tablet surface.

The (x,y) coordinates are commonly represented as either stroke-based data or image-based data. Recording the (x,y) coordinates at uniform time intervals creates stroke-based data. Image-based data is not time stamped, but rather each pen stroke is recorded as an image using only the (x,y) coordinates. Besides the time and the (x,y) coordinates, other values may also be recorded, such as a value denoting whether the pen 5 was in one of two states: up from the tablet surface (in which case the coordinates of the pen would not be determinable), and contacting the tablet surface. The series of recorded coordinates (and any other values) are typically referred to as sample points, and a series of words that have been recorded in such a manner are referred to as digitized handwriting samples.

After the sample points are generated, specialized handwriting software within the pen-based computer system attempts to recognize the series of sample points as known characters, symbols, etc. The handwriting software is usually comprised of two main components; a front-end processor that functions to characterize and reduce the amount of data contained in the digitized handwriting samples, and a recognizer which performs the actual recognition. The recognizer may be implemented using various methods, such as template matching and training-based recognition.

Template-matching recognizers attempt to match each character written by the user by comparing the character, pixel-by-pixel, to pre-made character templates that are stored in memory. In contrast, training-based recognizers do not utilize pre-made templates. Instead, training-based recognizers are operated in two modes, training and recognition. In the training mode, training-based recognizers are trained by statistically analyzing sets of training handwriting samples to develop statistical models of letters or words. The models allow for variability in the way letters and words can be written. These models are subsequently used in the test mode for recognition of test handwriting samples. Since training-based recognizers incorporate the statistical variance found in the training handwriting samples to recognize the test handwriting samples, training-based recognizers generally have a higher rate of recognition accuracy over template-matching recognizers.

To properly train a training-based recognizing device, a large amount of representative data is required to provide adequate statistical data. For example, recording 950 written words from 100 writers results in approximately 23 million coordinate pairs. (See David E. Rumelhart, *Theory to Practice: A Case Study—Recognizing Cursive Handwriting*). Because of the large number of coordinate pairs involved, a data reduction procedure is required before the coordinates can be used for training and recognition. The front-end processor is used to characterize the coordinate data in a way that retains the essential information about the handwriting, while reducing the amount of data presented to the training and recognition system.

Commonly, front-end processors produce a reduced data set from the original coordinate data by performing segmentation and feature extraction to produce what is called feature vectors. Segmentation refers to the process of partitioning the coordinates representing the path of the pen into separate groups of contiguous coordinates called segments. In general, there are two types of segmentation processes, uniform segmentation and non-uniform segmentation.

Uniform segmentation typically defines individual segments as a fixed number of (x,y) coordinates along a stroke, or according to a fixed distance along a stroke. Segments formed during uniform segmentation are usually independent of local features of the data. Unlike uniform segmentation, non-uniform segmentation defines segments based on some particular feature of the data, such as defining the end point of a segment to be where the pen changed vertical direction during writing. This results in segments that are formed by grouping the coordinates in each up-stroke and each down-stroke of the pen into separate segments. Referring again to FIG. 2, points 7, 9, and 11 shown on the letter "a" are examples of segment endpoints in the word "act". Segment endpoint 7 is the initial starting point of the pen during the first upstroke formed in the letter "a"; segment endpoint 9 is the transition point between the first upstroke and a downstroke; and segment endpoint 11 is the transition point between the downstroke and a second upstroke. An example of one segment comprising the letter "a" is segment 13, which is described by a list of those coordinates in the letter "a" located between segment start point 9 and segment endpoint 11. Halfway point 17 is the point which is located halfway between the start point 9 and the endpoint 11 of segment 13. The non-uniform segmentation process usually results in a series of segments that have unequal length.

After the segments are formed, the process of feature extraction is used to analyze the series of coordinates within each segment to derive "features" from each of the segments. Examples of features include the speed of the pen at the end of the segment, the net distance between the endpoints of the segment in the x-direction, and the net distance between the endpoints of the segment in the y-direction. Each feature extracted has value, for example the net distance in the x-direction for a particular segment may have a value of four pixels. The feature values taken from a segment are then grouped to form a feature vector for that segment.

After the front-end processor generates feature vectors from the coordinate data, a process called vector quantization is used to reduce the representation of segments from feature vectors to an even more compact form. Vector quantization is a mathematical process that is widely known and used in fields as image processing, telecommunications and speech recognition. The input to vector quantization is a multidimensional vector, called an input vector. Vector quantization statistically analyzes the data contained in the input vector to: identify how the values of the input vectors cluster or group together; determine the mean locations of the input vectors in each cluster; and determine the distribution of the vectors about the mean. A symbol is assigned to each cluster to identify the clusters, and this information is stored in what is called a codebook.

An input vector may be formed from only one feature vector or from a combination of feature vectors. When an input vector is formed by combining a group of separate feature vectors, the input resembles a matrix, where each column of the matrix is an individual feature vector. Whether or not the input matrix is comprised of one or many vectors, when vector quantization is performed to generate a codebook for the one input matrix, it is termed single vector quantization. However, if the input matrix is partitioned into sets of vectors, and vector quantization is performed to generate separate codebooks for the sets of vectors, it is termed multiple vector quantization.

In the field of handwriting recognition, signal processing front-ends utilize uniform segmentation in combination with single vector quantization to model the handwriting data. In single vector quantization, all the feature vectors formed from the coordinates generated from a stroke of the pen are combined to form an input vector. Vector quantization is then performed on the input vector to calculate statistics for the data contained in the input vector, such as the mean and the standard variations from the mean.

The problem with single vector quantization is that it results in a data space that has an extremely high data dimensionality. Every feature extracted from the sampled data creates what is called a dimension in the data space. For instance, if speed of motion in the x-direction is the only feature extracted from a segment, then the resulting data space is one dimensional. If the net x-distance is also extracted, then the data space is two dimensional. The data space refers to the region that encompasses the range of values that a particular feature value may have. For example, the values for speed-of- motion in the x-direction mentioned above may only range from zero to ten. These range of values between zero and ten forms the data space for the speed-of-motion feature.

In single vector quantization, the input vector usually has a high dimensionality due to the number of feature vectors involved. For example, assume that twenty feature vectors are formed from a particular handwriting sample and that each feature vector contains fourteen feature values that represent fourteen different physical aspects of the data (i.e. a fourteen-dimensional data space). Combining all twenty fourteen-dimensional feature vectors results in an input vector having a 280-dimensional data space (20*14=280).

During the training stage, the vector quantization process finds the statistical relationships formed by the distribution of the input vectors. A large amount of input vectors are required to fill the data space before the vector quantization process can generate a reliable estimate of the distribution of data in the data space. The ratio of the available number of input vectors to the dimensionality of the input vectors is referred to as data resolution. Since in a typical handwriting sample, only a finite amount of data is available, increasing the dimensionality of the data space results in reduced data resolution and diminished recognition accuracy. This phenomenon is known as the "curse of dimensionality."

The following example is provided to illustrate vector quantization and the principal of the curse of dimensionality. Assume that only one feature, speed of motion of the pen in the x-direction, has been extracted from one hundred data points of a particular handwriting sample. Assume further that one hundred speed values have been calculated from the sampled data and that the speed values range between zero and ten (the units are not important). During quantization, the many different speed values are replaced with a smaller representative set of numbers by grouping the values together into bins or ranges of values, and replacing each original speed value with the mean speed value of that bin.

The one-dimensional data space for the speed values may be partitioned into ten bins; one bin for values between zero and one, one bin for values between one and two, and so on, as shown in FIG. 3A. The dots in the example represent where the values fell in each bin and are raised from the horizontal axis for purposes of illustration. Since one hundred data values are available, in the case of a fairly uniform distribution ten values may be expected to fall within each bin.

In this example, ten values per bin during quantization may be sufficient for estimating the mean value position for each bin. As shown in FIG. 3B, the mean value for each bin is calculated and each speed value that fell within a particular bin is assigned that mean value. If, for example the mean value for bin four is 3.7, then every value in bin four would be assigned the value of 3.7.

If the data space is expanded to include two feature values then the data space increases to two dimensions. The second feature extracted could, for example, represent the acceleration of the pen in the x-direction for each data point. This two dimensional data space is depicted in FIG. 4. The number of bins in the data space now increases to $10^2$. Since there is a fixed amount of data points available, one hundred in this example, on average only one data point per bin is available. If the number of dimensions increases to three by adding a third feature value, the number of bins increases to $10^3$, or one thousand, and only one-tenth of a data point is available per bin, in which case most of the bins are empty.

As the number of dimensions increases, the number of bins increases exponentially, and with only a fixed amount of data available most of the bins in the data space become empty. For bins with few or no data points, the statistics representing those bins are poor, i.e., the standard deviation of the mean value in the bin is large or indefinite. Obviously, having a high input dimensionality results in a poor estimate of the distribution or statistical property of the data that is input to the vector quantization process due to the low data resolution.

Currently, only very specialized methods are capable of performing single vector analysis on vectors having dimensionalities greater than thirty. Because of the costly computations involved, applications having high data dimensionality are not suited for real-time recognition applications. In addition, applications having high data dimensionality fail to effectively reduce the amount of data in the original data set which results in increased memory requirements.

Accordingly, an object of the present invention is to provide an improved handwriting signal processing front-end for use with handwriting recognition systems which increases data resolution, effectively reduces the dimensionality of the input data, and results in greater recognition accuracy.

A more specific object of the present invention is to provide an improved handwriting recognition system which incorporates non-uniform segmentation, feature extraction and multiple vector quantization.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

SUMMARY OF THE INVENTION

The present invention includes a front-end signal processing method for a handwriting training and recognition system. Digitized handwriting samples formed by a stroke of a writing instrument on a tablet are input to the system and represented as a series of (x,y) coordinates. The front-end processing method segments the strokes based on interrelationships of the (x,y) coordinates into an ordered set of non-uniform segments for each of the handwriting training samples. A plurality of feature values are extracted from each of the segments and each of the extracted feature values is used to form entries of a feature vector. The entries corresponding to one of the feature values from contiguous groups of the feature vectors are then combined to form a series of feature-specific vectors. Multiple vector quantization is used to statistically characterize the distribution of the feature-specific vectors by calculating a mean value and a distribution about the mean value for the feature-specific vectors. These mean values are labelled with symbols and both the mean values and the symbols are stored in codebooks to effect a reduced representation of the handwriting training samples.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 13 is a representation of the output generated by a multiple vector quantizer for the input letter "y".

DESCRIPTION OF THE PREFERRED EMBODIMENT

The present invention will be described in terms of the preferred embodiment. The present invention is a software implemented front-end method for processing handwriting data using non-uniform segmentation of stroke-data and feature extraction in combination with multiple vector quantization. The present invention may be used in either a real time or non-real time handwriting recognition system, and may be adapted to recognize a single input word or a series of words.

Figure 5A:
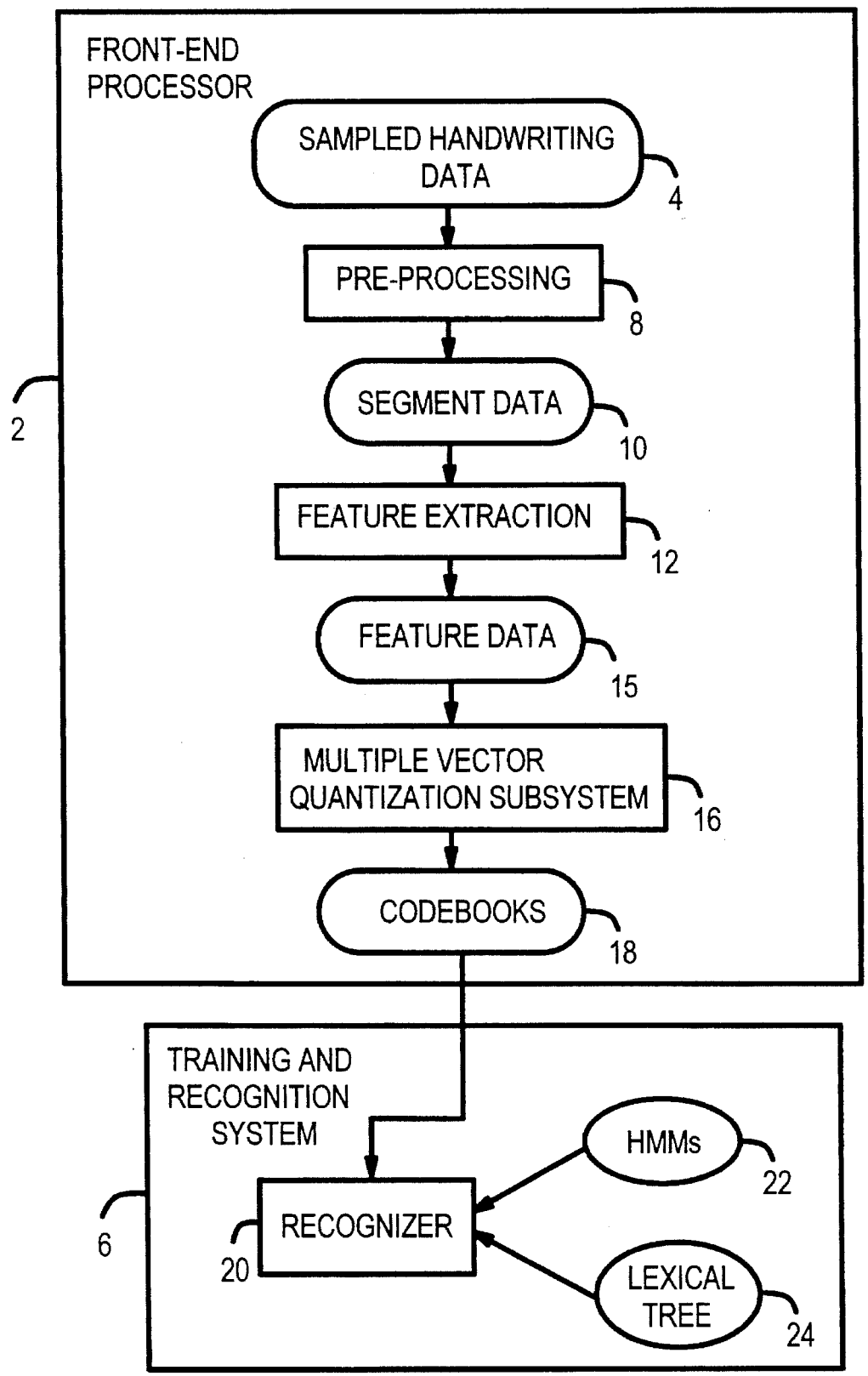
FIG. 5A is a flow-chart of a handwriting signal processing front-end according to the present invention.

As shown in FIG. 5A, a function of the front-end processor 2 is to process and accurately represent sampled handwriting data 4 in a form that may be used by a training and recognition system 6. Input to the front-end processor 2 is digitized sampled handwriting data 4 representing strings of characters and symbols in the form of a series of (x,y) coordinates.

A pre-processing step 8 is performed on the handwriting data 4 in order to partition the handwriting data 4 into segment data 10. Feature data 15 is extracted from the segment data 10 by the feature extraction step 12. Feature data 15 is information embodying characteristics of the segment data 10 and is used as an input to a multiple vector quantizer subsystem 16. The quantizer subsystem 16 calculates the distribution of data contained in the feature data 15. The output of the quantizer subsystem 16 is a series of codebooks 18 for use by the training and recognition system 6. The front-end processor 2 of the present invention is compatible with many types of recognition systems. However, in a preferred embodiment, the recognition system 6 includes a recognizer 20 that utilizes Hidden Markov Models (HMMs) 22 and a lexical tree 24.

Although outside the scope of the subject invention, a brief explanation of HMMs 22 is given for clarity. Each of the HMMs 22 is basically a flexible template of a letter, phrase, or digit for example, which may force all occurrences and styles of the given object to be represented by a single model. The HMMs take the variability of handwriting samples into account when computing the probability that an input stream of data is modeled by a given HMM. (For further information see Rabiner, L. R. and B. H. Juang: "An Introduction to Hidden Markov Models," IEEE ASSP, Vol. 3, No. 1 at 4–16 (1986)).

A lexical tree 24 is a compression technique for representing a large dictionary of words and is similar to a linked list. Algorithms in the recognizer 20 first utilize the HMMs 22 to compute the probability that the codebooks 18 generated by the front-end processor represent particular letter combinations. The recognizer 20 then considers only those letter combinations (e.g. words) that are found in the lexical tree 24. In a preferred embodiment, the lexical tree 24 searches for large-vocabulary writer-independent printed and cursive words.

Figure 5B:
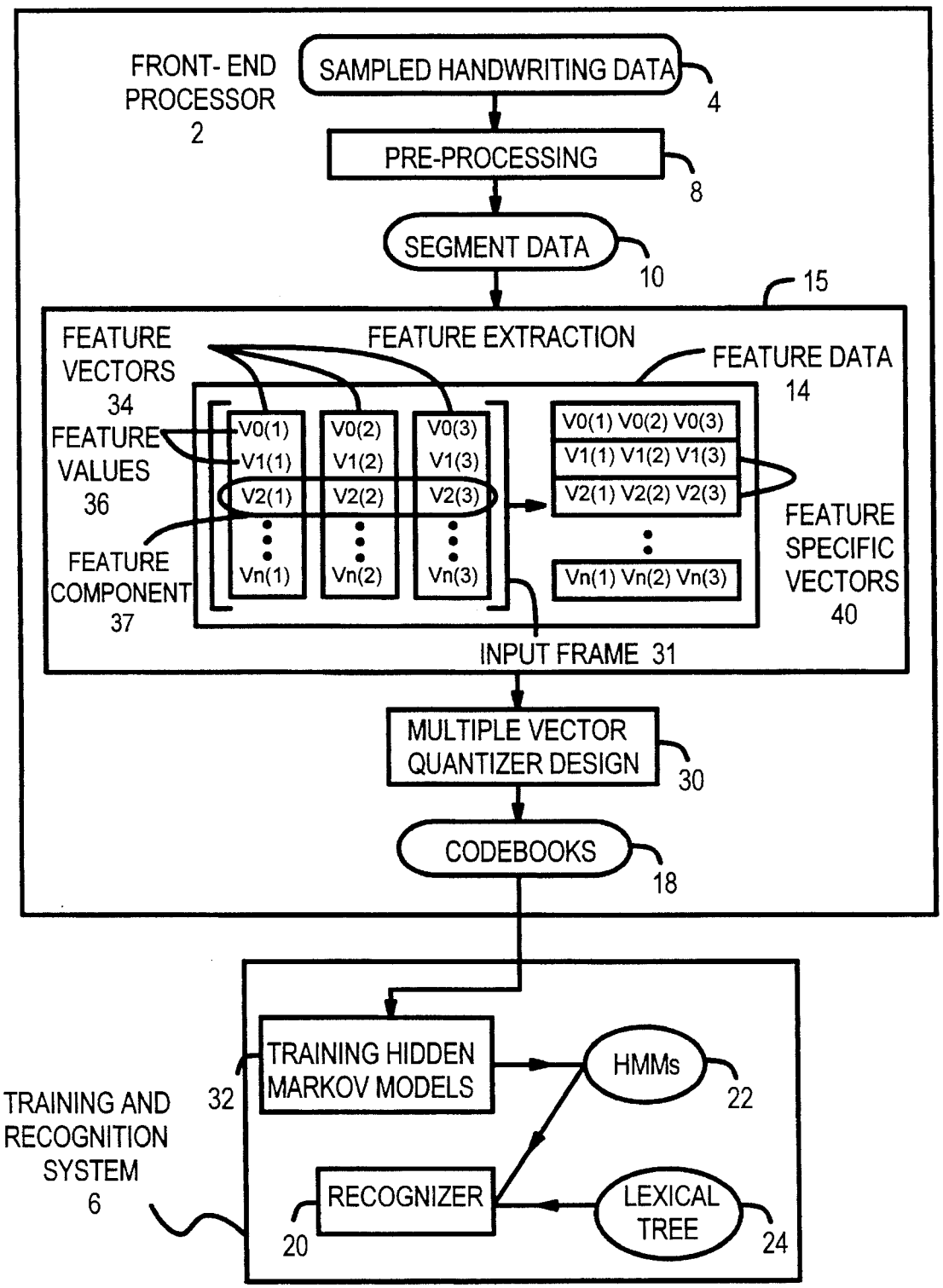
FIG. 5B is a flow-chart of the handwriting signal processing front-end in training mode.
Figure 5C:
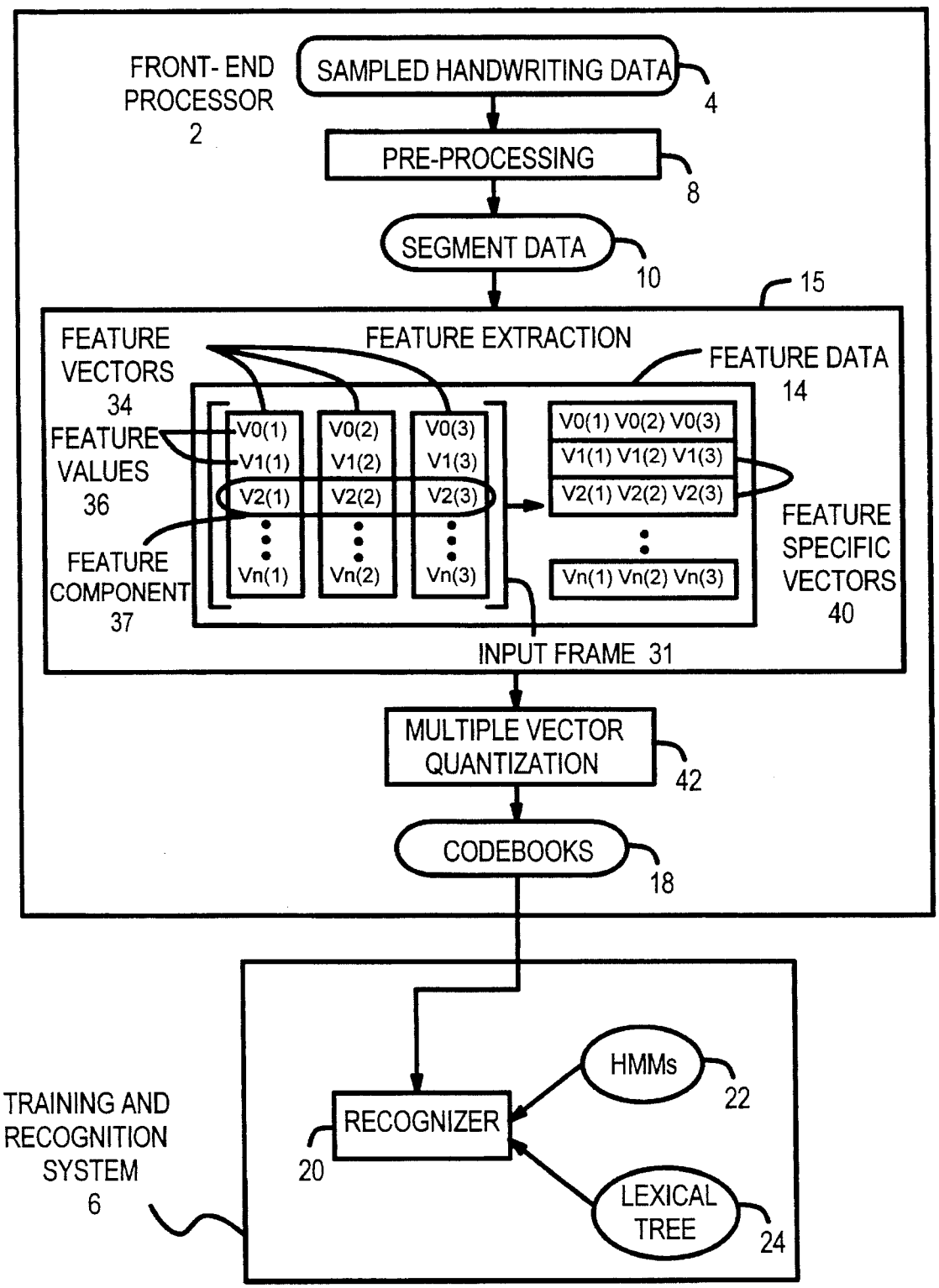
FIG. 5C is a flow-chart of the handwriting signal processing front-end in test mode.

Before any handwriting recognition can occur, however, the HMMs 22 must first be created and trained. Therefore, the system shown in FIG. 5A operates in two modes: training and testing. FIG. 5B is a flow chart of operation the system in the training mode, and FIG. 5C is a flow chart illustrating the testing mode.

As stated above, vector quantization is performed during training to design codebooks which represent clusters of input vectors, and each cluster in a codebook is assigned a symbol for identification. The codebooks are then used to train the HHMs 22. When vector quantization is performed during the test mode, a set of symbols from the codebooks are assigned to represent test handwriting samples, and these symbols are then used by the recognizer 20 to identify the handwriting. Therefore, the multiple vector quantization subsystem 16 (FIG. 5A) performs the step of multiple vector quantizer design 30 in the training mode (FIG. 5B), and the step of multiple vector quantization 42 in the test mode, as shown in FIG. 5C. Referring to FIG. 5B, the codebooks 18 generated during multiple vector quantizer design 30 are used to train the HMMs 22 in the training step 32.

In the training mode, the feature data 15 is input to the multiple vector quantizer design 30 in the form of a series of input frames 31, which, in a preferred embodiment, are comprised of three feature vectors 34 from contiguous segments of the handwriting sample. Each of the feature vectors 34 contains a plurality of feature values 36 that were extracted from segment data 10 during feature extraction 12. The plurality of feature values 36 shown are denoted by the letters V0–Vn where n may be any number. The specific types of feature values 36 extracted from segment data 10 in a preferred embodiment of the subject invention are described below.

Feature-specific vectors 40 are then formed from each input frame 31 by grouping features of the same type from each of the feature vectors 34 within the input frame 31. Each group of features forming a feature-specific vector 40 are referred to as a feature component 37. As shown in FIG. 5B, the feature value V2, for instance, is contained in each feature vector 34 comprising input frame 31. The feature value V2 could, for example, represent the speed of the pen in the x-direction. The feature value V2 for each of the three feature vectors 34 are grouped, as shown by the dashed lines, to form a feature-specific vector 40 for this particular feature component i.e. the feature-specific vector 40 representing the feature component 37 for speed of motion of the pen is comprised of the values V2(1), V2(2), and V2(3). A feature-specific vector 40 is formed for every feature component 37 in input frame 31, creating a feature-specific vector 40 for the values V1(1), V1(2), and V1(3) through Vn(1), Vn(2), and Vn(3), as shown.

The resulting series of feature-specific vectors 40 are then used in the multiple vector quantizer design 30 to generate codebooks for each feature component 37. After all the training handwriting samples have been processed, the codebooks 18 mathematically represent how the feature-specific vectors 40 from the set of training handwriting samples are grouped or clustered, e.g. as per a euclidian distance measure. As previously mentioned, the codebooks 18 for each feature-specific vector 40 are generated during the step of multiple vector quantizer design 30 and are then used for in the step of training the HMMs 32.

Referring to FIG. 5C, during the test phase, sampled handwriting data 4 that is to be recognized is converted into input frames 31 by the pre-processing step 8 to produce segment data 10, and feature extraction 12 is performed on the segment data 10, as in the training phrase. After the test-data feature-specific vectors 40 for each feature component 37 are extracted from each input frame 31, the multiple vector quantization 42 process analyzes these new feature-specific vectors and assigns each feature-specific vector 40 the symbol in the codebook 18 to which that vector is closest. Since a symbol is used to represent each test-data feature-specific vector, multiple vector quantization 42 effects a reduced representation of the sampled handwriting data. The symbols from the codebook 18 for each feature-specific vector 40 are then used by the recognizer 20 for recognition.

Figure 6:
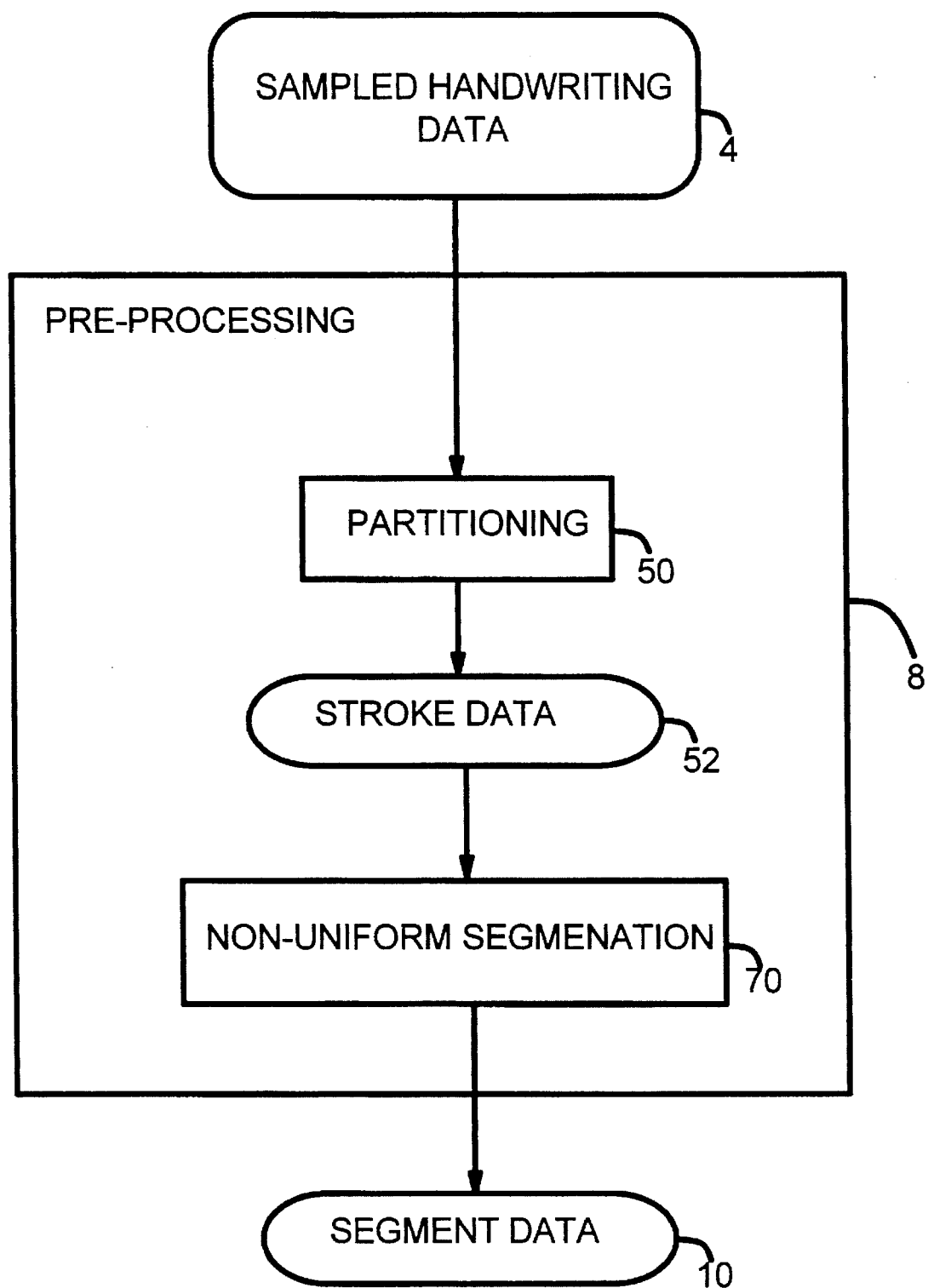
FIG. 6 is a flow chart of pre-processing handwriting data.

As shown in FIG. 6, the first stage of pre-processing 8 is partitioning (step 50) the handwriting data 4 into stroke data 52. Incoming handwriting data 4 may either be in the form of a an individual word or a phrase. If the handwriting data 4 is a word, then the word is partitioned into stroke data 52. However, if the handwriting data 4 is in the form of a phrase, then the phrase is first broken into individual words, and the resulting series of words is partitioned into stroke data 52 one word at a time.

Figure 12:
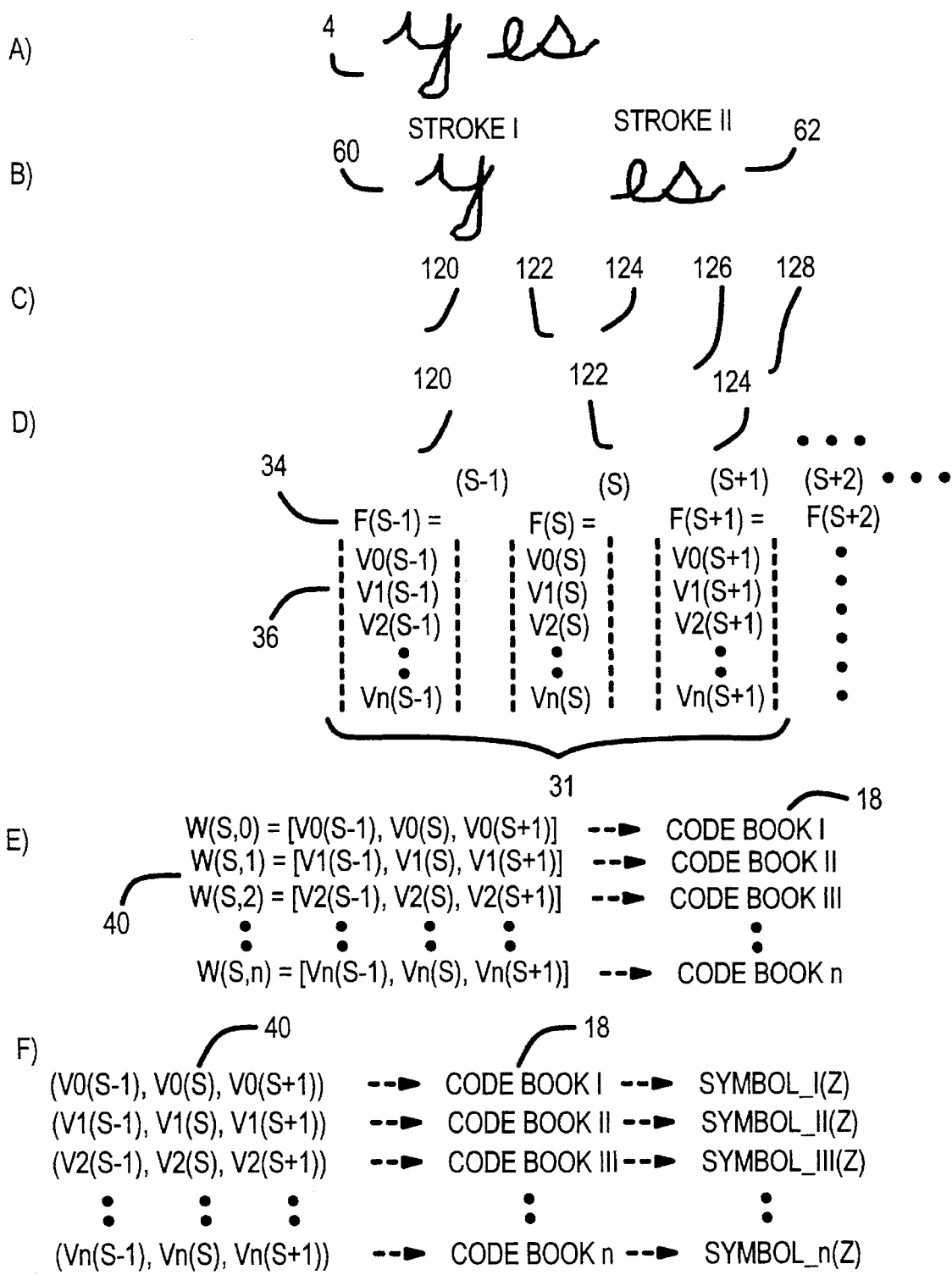
FIG. 12 is a flow chart showing the steps performed during front-end processing on a sample input word.

FIG. 12 depicts an example of a word that has been partitioned into stroke data. Step (A) of FIG. 12, shows a digitized cursive handwriting sample 4 that forms the word "yes" that has been input to the system. In step (B), the handwriting sample 4 is partitioned into strokes where each stroke is defined as a continuous series of pen-down sample points. A stroke is ended when the data indicates that the digitizing pen was lifted from the writing tablet. In the example shown, the writer lifted the pen after writing the letter "y" and began writing again to form the letters "e" and "s". Thus, stroke I, referred to by the reference numeral 60, forms the letter "y" and stroke II, referred to by the reference numeral 62, forms the contiguous letters "es". The remainder of FIG. 12 is discussed throughout the description of the front-end processing method below.

Figure 7:
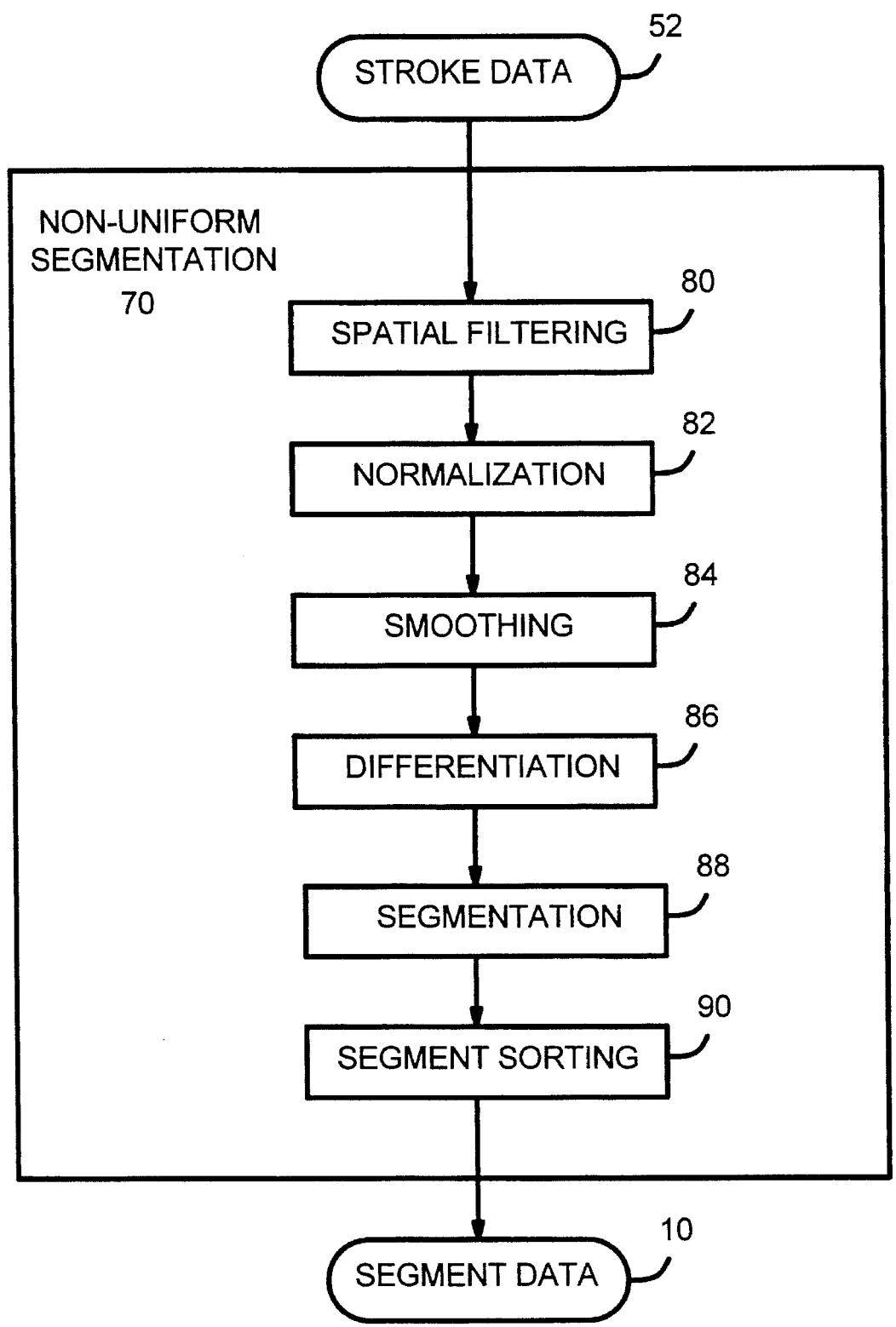
FIG. 7 is a flow-chart depicting the process of non-uniform segmentation of stroke data.

Referring back to FIG. 6, in the second stage of pre-processing, each stroke of the stroke data 52 is processed separately by a procedure called non-uniform segmentation 70. As shown by FIG. 7, non-uniform segmentation 70 transforms stroke data 52 into segment data 10 through a sequence of steps which include spatial filtering 80, normalization 82, smoothing 84, differentiation 86, segmentation 88, and segment sorting 90.

Strokes may be partitioned into segments using either uniform segmentation or non-uniform segmentation. In a preferred embodiment of the present invention, non-uniform segmentation is combined with multiple vector quantization to reduce the amount of coordinate data from the handwriting samples. The advantage of non-uniform segmentation over uniform segmentation, is that non-uniform segmentation creates segments that usually cover more area of a stroke than do uniform segments. This results in a lower number of segments which must be processed, and may decrease the processing time of the front-end processor. It should be noted, however, that the front-end processor of the present invention will operate using either non-uniform or uniform segments.

Spatial filtering 80 is the first step in non-uniform segmentation 70 and is a procedure used to reduce the number of sample points within a stroke. The input to the spatial filtering process 80 is a file containing a time series recording of stroke data 52, consisting minimally of a set of (x,y) coordinate pairs. In a preferred embodiment, a third value may be included denoting pen proximity to the digitizing tablet, such as pen up or pen down, for example. Additional values could include pen pressure, pen angle, and pen acceleration.

Figure 1:
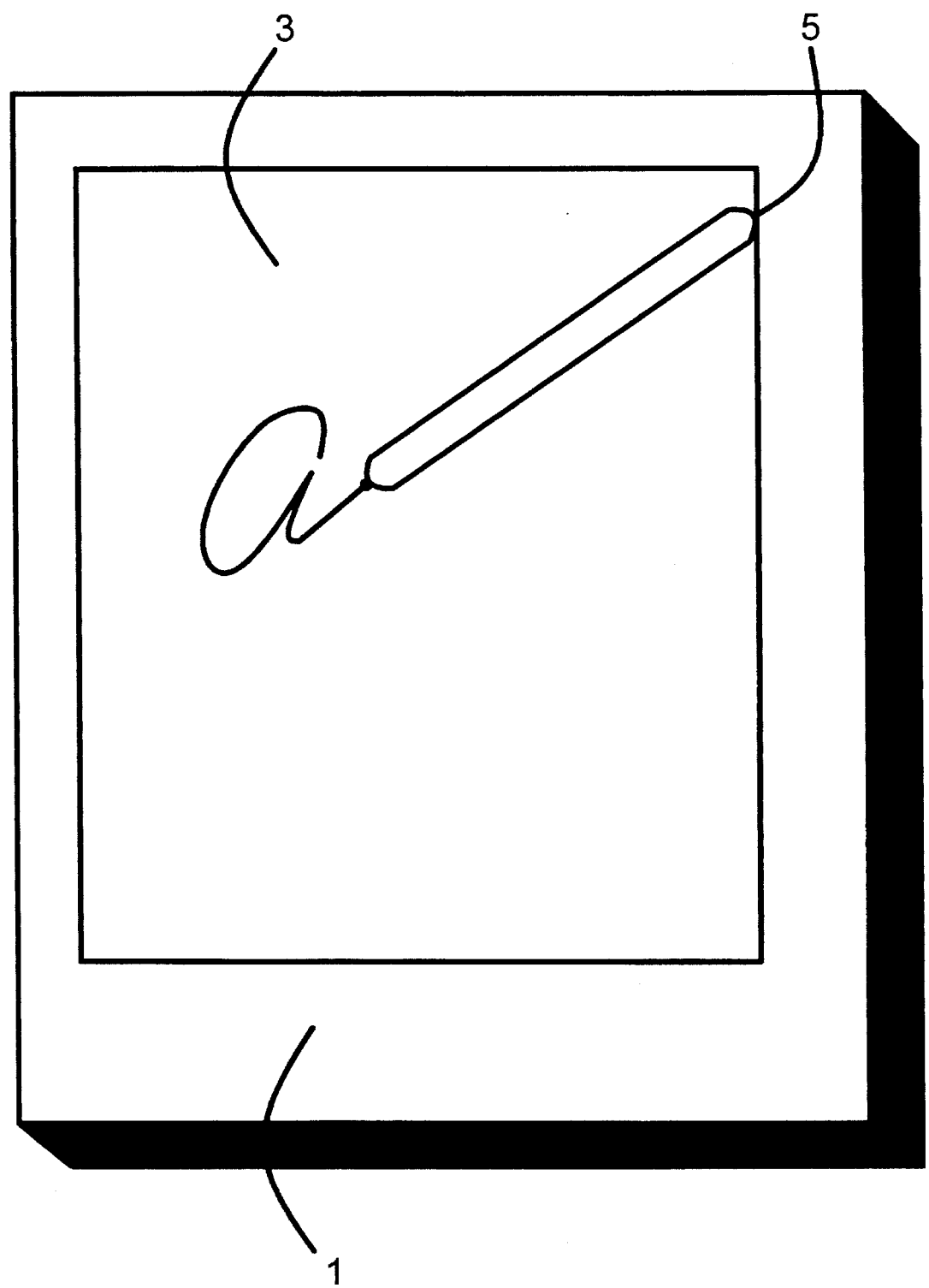
FIG. 1 is a diagram depicting a pen-based computer.
Figure 2:
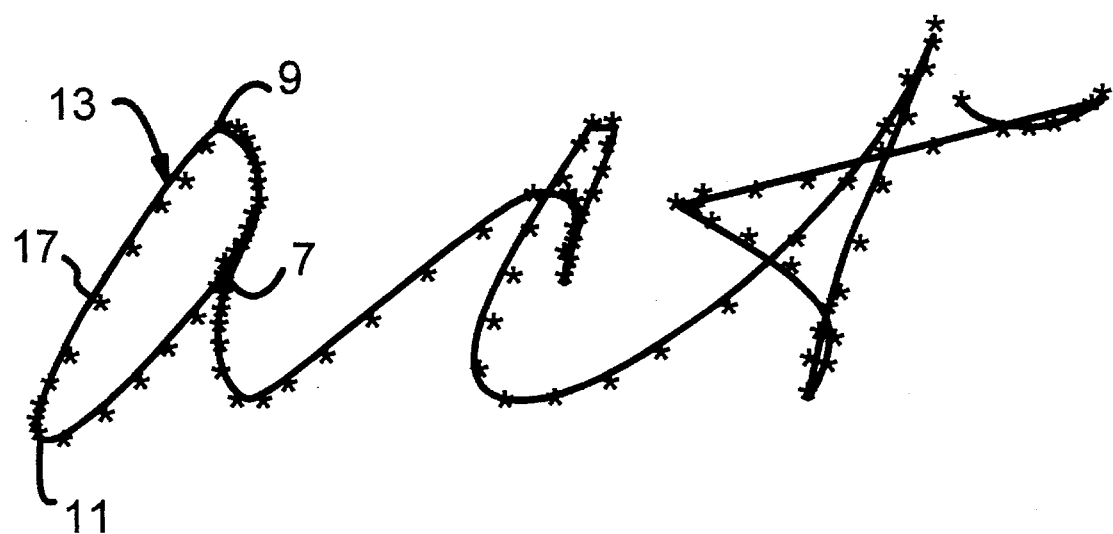
FIG. 2 is a graphical representation of the sample points for a cursive handwriting sample.
Figure 3A:
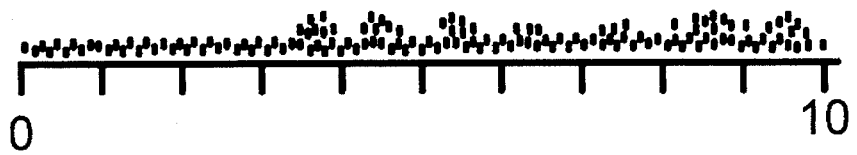
FIG. 3A is a graph showing bins of a one-dimensional data space for a feature value that has been extracted from a digitized handwriting sample.
Figure 3B:
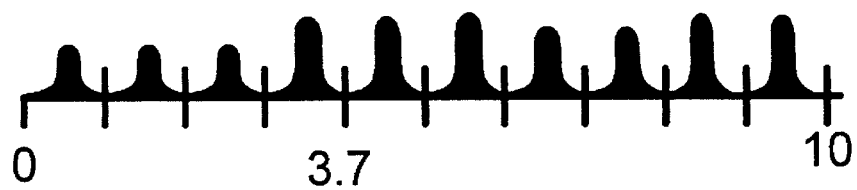
FIG. 3B is a graph showing mean values in each bin of the one-dimensional data space for the feature values extracted from a digitized handwriting sample.
Figure 4:
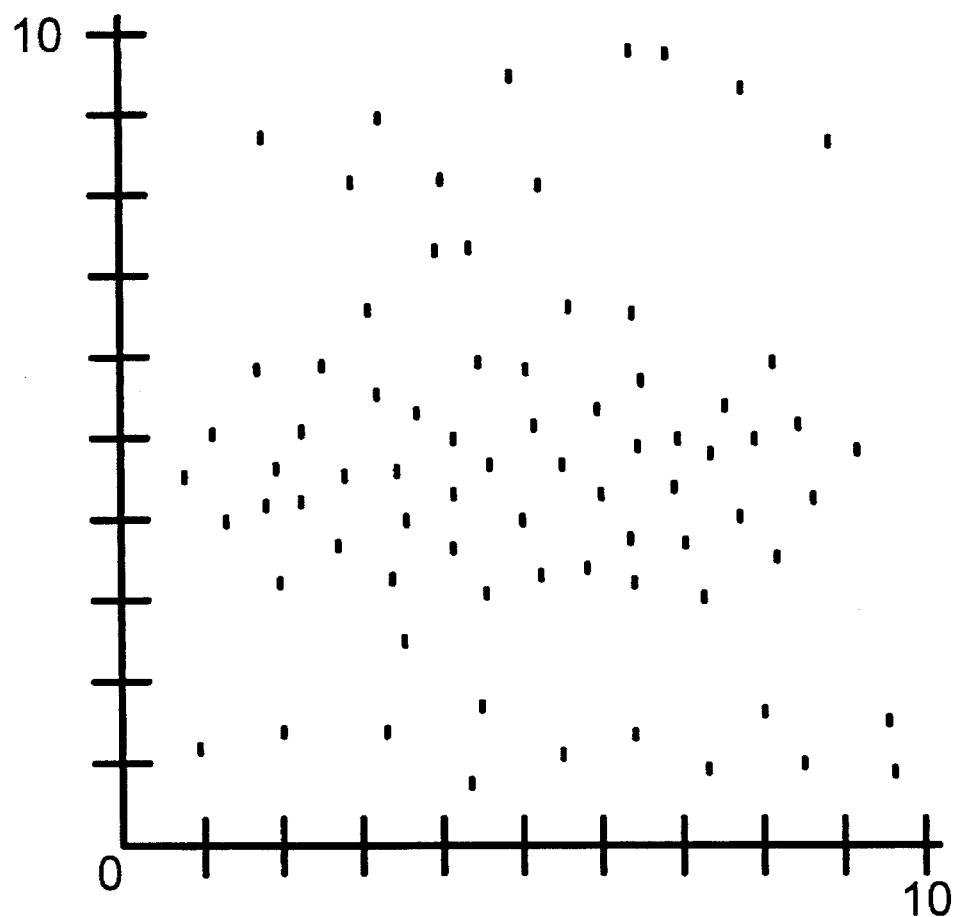
FIG. 4 is a graph showing a two-dimensional data space for two feature values extracted from a digitized handwriting sample.

Referring back FIG. 2, the concentrated areas of sample points (indicated by stars) are areas where the pen moved with the least velocity. As shown, concentrated areas of sample points in a stroke often contain redundant sample points. Spatial filtering 80 is used, for instance, to reduce the number of sample points associated with back-and-forth movements used to create the dot in the letter "i" or to reduce the points associated with the initial pen position just before writing begins.

The spatial filtering process 80 removes duplicate sample points within a stroke along with sample points that fall within a specified minimum vector distance of the last accepted point in order to remove redundant sample points. The minimum distance threshold may be specified in actual hardware coordinates, such as a number of pixels. The minimum distance threshold may also be specified as a vector distance, and the data may first be normalized to a uniform height. All sample points with a pen value of up are discarded in the spatial filtering process 80.

Unlike some pre-processing approaches, the present invention does not require any cleaning-up of images or strokes by stripping ligatures (fancy strokes or lines at the end of a letter). Such a process may be necessary for template matching recognizers because they are unable to handle such variability in the data. Statistical modeling methods, however, are usually less sensitive to such details, so pre-processing to alter what was actually written may be unnecessary.

It should be noted that the spatial filtering process 80 rarely removes sample points within otherwise normal strokes. The output of the spatial filtering 80 is a set of strokes defined as a sequence of pen-down sample points that are separated by a predetermined minimum distance.

The normalization 82 of handwriting data refers to a method which standardizes the size of characters, or the sizes of feature values extracted from the character, using average height and width values for a particular writer. During training, average height and width values are calculated from training words grouped by word and writer. Since each word used in training is known, the number of characters described by the sequence of strokes is also known. The number of characters per word is then used to develop a statistical estimate of a writer-dependent average height and width of a character. The estimates are obtained by dividing the x- and y-ranges of a word boundary box (the corners of which are the maximum and minimum x- and y-coordinates of the word) by the number of characters in the word. The boundary box for the word "art" would appear similar to the box surrounding the "art" shown in FIG. 2, except the box would be formed around the outmost sample points of the word, such as the bottom of the letter "a" and the tips of the letter "t".

Handwriting objects that may be normalized may include an entire character, stroke sample points, or a set of feature values extracted from the handwriting data. The average height and width values described above, are then used to scale or normalize an object by dividing the object's actual height and width values by the average height and width values. When stroke sample points are normalized, each sample point within a stroke is rescaled by the average width and height values, thereby redrawing the stroke. Feature values are subsequently extracted from the rescaled sample points to capture relationships among the data, as explained below.

During training, the average height and width values calculated during normalization 82 may be used to normalize an entire set of writer-dependent feature values on a word-by-word basis once they are extracted from the handwriting data. Normalizing the entire set of extracted feature values leaves original sample points unchanged, and in most instances, is more efficient than normalizing stroke sample points because of the fewer number of computations involved. The choice of whether to scale characters, strokes or sets of feature values is driven by memory and speed requirements of the hardware platform chosen to run the front-end process of the present invention.

Normalization 82 may be used to normalize handwriting data for either a particular writer or for a pool of writers. If characters are to be normalized for a particular writer, then the average height and width of the writer's characters are calculated. Likewise, if characters are to be normalized for a pool of training writers, then global average height and width values are calculated.

During the testing phase (as opposed to the training phase), the number of characters represented by an input file of strokes is not known because it is not known what word has been written. To assist in estimating the number of characters in a word, i.e., the character count, histograms for words of each character count are constructed during training to track the number of segments detected for those words. The histograms are then normalized to form character-count density functions using well-known methods.

In the preferred embodiment, each character-count density function is stored as a file which lists the probability that words having a certain number of characters are formed by a given number of segments. For example, the density function for words comprised of three characters may include the following probabilities:

2% of the three character training words were formed by seven segments;

31% of the three character training words were formed by eight segments;

47% of the three character training words were formed by nine segments; and

20% of the three character training words were formed by ten segments.

The normalization process 82 determines the probability that a test word is comprised of a given number of characters by using the density functions that were formed from the histograms during training. In the testing phase, the number of characters predicted to be in a test word comprised of a given number of segments is equated to the character count of the density function that has the highest probability for that particular number of segments. For example, assume an input test word is comprised of eight segments. The goal is to estimate how many characters form the test word, using the density functions that were formed during training. The number of characters in the test word is equated to the character count of the density function having the highest probability for eight segments. If the density function for three character words includes the probability that 47% of three character words were formed from eight segments, and 47% is the highest probability found for all the density functions, then the test word would be assigned a character count of three.

Just as in the training phase, the resulting character count is used in conjunction with the net x-distance and y-distance spanned by the boundary boxes of test words to estimate an average character height and width. The average character width, for example, is calculated by dividing the net x-distance spanned by boundary boxes for each test word by the number of characters predicted to be in that test word. The actual height and width values estimated for each character in a test word for a given writer are then normalized using the average values. The normalization technique can be adapted to be writer dependent, as just described, or fixed for use with samples from many writers.

Optionally, the final step in the process of normalization 82 may include performing scale, rotation and translation adjustments to either the entire stroke set or a group of segments in order to center the stokes before features are extracted. This type of processing would straighten slanted words for instance.

The smoothing process 84 (FIG. 7) refers to standard methods for smoothing a time series of (x,y) coordinates or sample points. This process is performed to further precondition the data by making curves within the data smoother. New sample points are created from a weighted average value of a sample point and its neighbors. Because the method of non-uniform segmentation requires computation of the first-derivative of the time series of y-coordinates, smoothing consists of low-pass filtering. In the preferred embodiment of the present invention, the x- and y-coordinates for a given stroke are smoothed using a three-point (0.25, 0.5, 0.25) moving-average low-pass filter. The three values refer to the weights assigned to a sample point and its neighbors. For instance, if a given point on a stroke has x- and y-coordinates of (2,4), and the point has neighboring points that have coordinates (1,1) and (3,2), respectively, then the point (2,4) would be mapped to the smoothed point:

$$x=((0.25*1+0.5*2+0.25*3)=2 \text{ and}$$

$$y=(0.25*1+0.5*4+0.25*2)=2.75$$

The memory and speed of the hardware platform may dictate the choice of whether to use a three-point, five-point, or n-point filter.

The differentiation process 86 refers to standard methods for calculating time derivatives for time-series sample points. The first derivative calculation creates an x- and y-velocity series. Acceleration for a given stroke is then estimated by computing the first derivative of the smoothed x- and y- velocity series. The velocity and acceleration values computed during differentiation 86 are used later to define segment endpoints. Since the endpoints are based on the behavior of the y-coordinate, the velocity criterion makes the endpoint location determination independent of the actual y-coordinates of the data on the digitizing tablet.

Segmentation 88 refers to the process of partitioning a set of sample points corresponding to a single stroke into smaller contiguous sets of sample points of possibly unequal lengths, termed segments. To partition a stroke into segments requires determination of the location of a series of segment start-and end-points.

The segmentation process locates start- and end-points of segments using a multi-pass strategy. To begin, the first point in a stroke to be segmented is defined as the start point of the first segment within the stroke, while the last point of a stroke is defined as the end point of the last segment within the stroke. In the first pass, additional segment start- and end-points are defined to be where the first time derivative of y-coordinates passes through zero, i.e., positions where the y-direction changes from negative to positive, or positive to negative. The first pass produces a list of proposed segment boundaries.

To visualize the process of breaking a stroke into non-uniform segments, refer to steps (B) and (C) of FIG. 12 which graphically depict how the letter "y" is partitioned into segments. As shown in step (B), the letter "y" is formed in one stroke 60. It is this single stroke 60 that is then partitioned into individual segments. In step (C), the letter "y" is divided into five segments, referred to by the reference numerals 120, 122, 124, 126, and 128. Each of the segments 120, 122, 124, 126, and 128 ends or begins at a zero-crossing of the first time derivative of the y-coordinates, i.e., where the stroke changed directions vertically.

Figure 8:
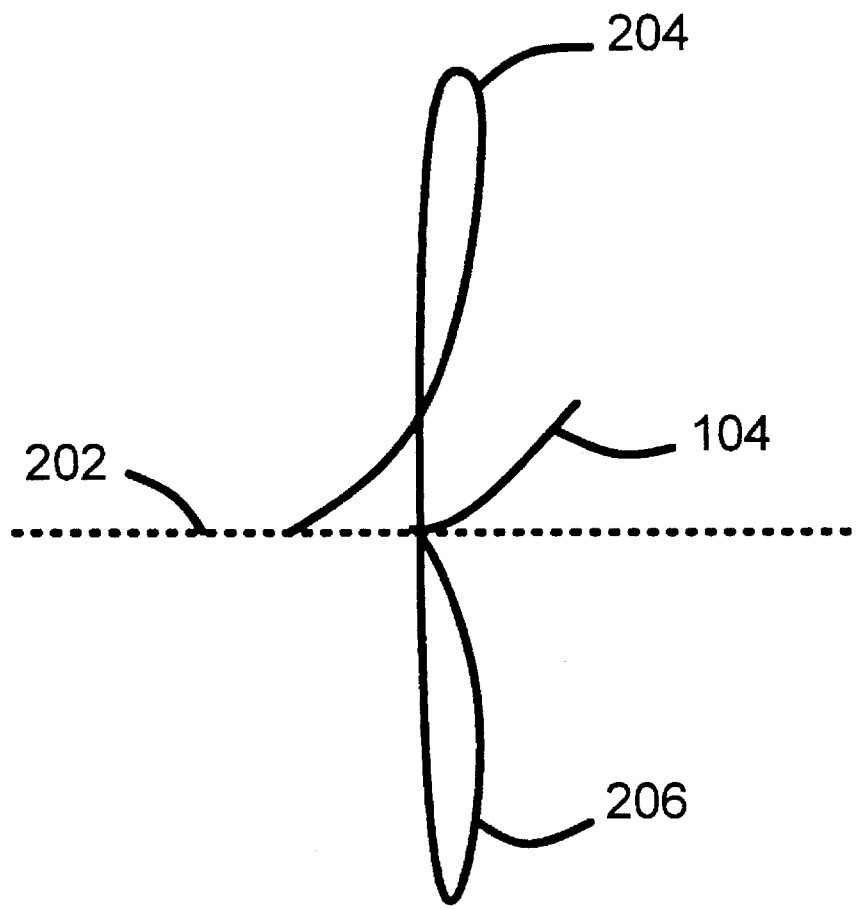
FIG. 8 is a depiction of a handwritten cursive-letter "f".

In the second pass of the segmentation process, additional segment start- and end-points are defined to be the negative-to-positive zero-crossings of the (optionally smoothed) second time derivative of the y-coordinate time series. The rationale for this second pass stems from the visual observation of characters such as lower case cursive "f" and lower case "t". These characters are usually formed with a tail that begins at the baseline of the letter and ends in upward motion (especially when written as a single stroke) as shown in FIG. 8 The letter "f" for instance, is usually written starting with a top loop 204 that begins and ends at the baseline 202. Next a bottom loop 206 is formed that also begins and ends at the baseline 202. Finally, a small tail 104 is usually drawn that starts at the end of the bottom loop 206 and extends above the baseline 202. In such a situation, the first pass fails to detect the end of the tail 104 located at the baseline 202 due to the lack of a change of vertical direction. A visual inspection of the letter suggests that even where vertical direction has not changed, the pen must slow to a degree that the tail 104 should be treated as a separate segment. The second pass, which determines where the second derivative of the y-velocity curve (i.e., acceleration) has a local minimum greater than zero, detects segments such as these. The product of the second pass is a second list of proposed segment boundaries.

Referring back to FIG. 7, the third and final pass of the segmentation process 88 is performed on the proposed lists of segment start- and end-points. The first task performed during the final pass of segmentation is to combine the boundary-point lists that were generated during the first two passes. Next, to ensure that segments are larger than a minimum size, segments that contain fewer than a threshold number of points are recursively merged with a neighboring segment, until the new segment has a length greater than a predetermined size. Finally, segments that have greater than a threshold number of points are divided into two (or more) smaller segments. In alternative embodiments, other types of processing may be applied at this point, such as additional heuristics to identify and apply labels to segments or strokes that form the dot on an "i" or the cross on a "t" or special processing for strokes which consist of single points.

The last process during non-uniform segmentation 70 is segment sorting 90. Segment sorting 90 refers to the process of reordering segments based on the value of the x-coordinates in the time series data. The purpose of segment sorting is to properly position stroke segments as close as possible to other stroke segments of same letter. Segment sorting is necessary because raw stroke-based input data reflects the actual sequence of strokes in time generated by the writer; the stroke-based input is not recorded according to x-positions For example, a word such as "action" when written in lower case cursive, could consist of three strokes where stroke one forms the word "action" with an uncrossed "t" and an undotted "i" stroke two forms the dot above the "i" and stroke three forms the cross on the "t". The separate strokes used for dotting the "i" and crossing the "t" are referred to as return strokes. To properly analyze the sampled handwriting data, it is necessary to reorder the stroke segments so the dot and cross strokes are as close as possible to the segments corresponding to the undotted "i" and uncrossed "t". Such a reordering is based on the x-coordinates of the time series data.

Several methods exist to insert return stroke segments into the sequence of non-return stroke segments. One choice is to reorder strokes based on stroke mean x-position, or reorder segments based on segment mean x-position. These choices, however, lead to poor recognition results.

In a preferred embodiment, reordering is accomplished by defining a return stroke as any stroke which overlaps the boundary box of any other stroke. To calculate this overlap, an overlap matrix is used to tabulate for each stroke which, if any, strokes it overlaps with. The matrix contains as many rows and columns as there are strokes. An indicator, such as a value of true, in the nth row and mth column position in the matrix denotes that the nth stroke intersects with the mth stroke. Each row of the matrix is used to direct processing so that all of the strokes that overlap with the first stroke are handled first, and those leftover and which overlap with the second stroke are processed next, etc. When a return stroke is found to overlap a host stroke, the block of segments corresponding to the return stroke is associated with the sequence of segments of the host stroke.

The return stroke is inserted in the sequence of host segments where the vector distance between host segment ending points, or other representative points, and the start point of the return stroke is the shortest. In the preferred embodiment, not every segment within the sequence of host segments is used in this calculation. The only host segments chosen are the segments that indicate the pen changed direction from up-to-down, or from flat-to-down, e.g., the top of a loop. Only these segments are chosen because return strokes are usually written at the top of strokes that form, for example, an uncrossed "t" and undotted "i." Therefore, such segment endpoints are identified by analyzing where the first derivative of the y-velocity data changes in value from positive, or zero, to negative.

After the subset of host segments are defined, a vector distance (Euclidian) is computed between each host segment end-point and a representative point in the return stroke, such as the start point of the first segment in the return stroke. The vector distance between the segment end-points and a point in the return stroke is determined by calculating the square root of:

$$(Xr-Xh)^2/Wx + (Yr-Yh)^2/Wy$$

where Xr=the x coordinate of the point in return stroke, Xh=the x coordinate of the point in host stroke, Yr=the y coordinate of the point in return stroke, and Yh=the y coordinate of the point in host stroke. Wx and Wy represent a weight that may be used to obtain a trade-off in the importance of vertical and horizontal contributions to the computed vector distance. After the vector distance is computed, the return stroke is associated with the host segment to which the start-point of the return stroke is closest in vector distance.

In the preferred implementation, when segment data is reordered, the segment data is not physically relocated. Rather, a table of pointers is generated which directs the order in which to process the segments. Segment data 10 includes a file of contiguous segment sample points for each segment and the table of pointers described above. Non-uniform segmentation 70 is the last process that occurs during pre-processing 8. The next step in front-end processing 2 is to perform feature extraction 12 on the segment data 10 in order to capture behavior characteristics of the data.

Figure 9:
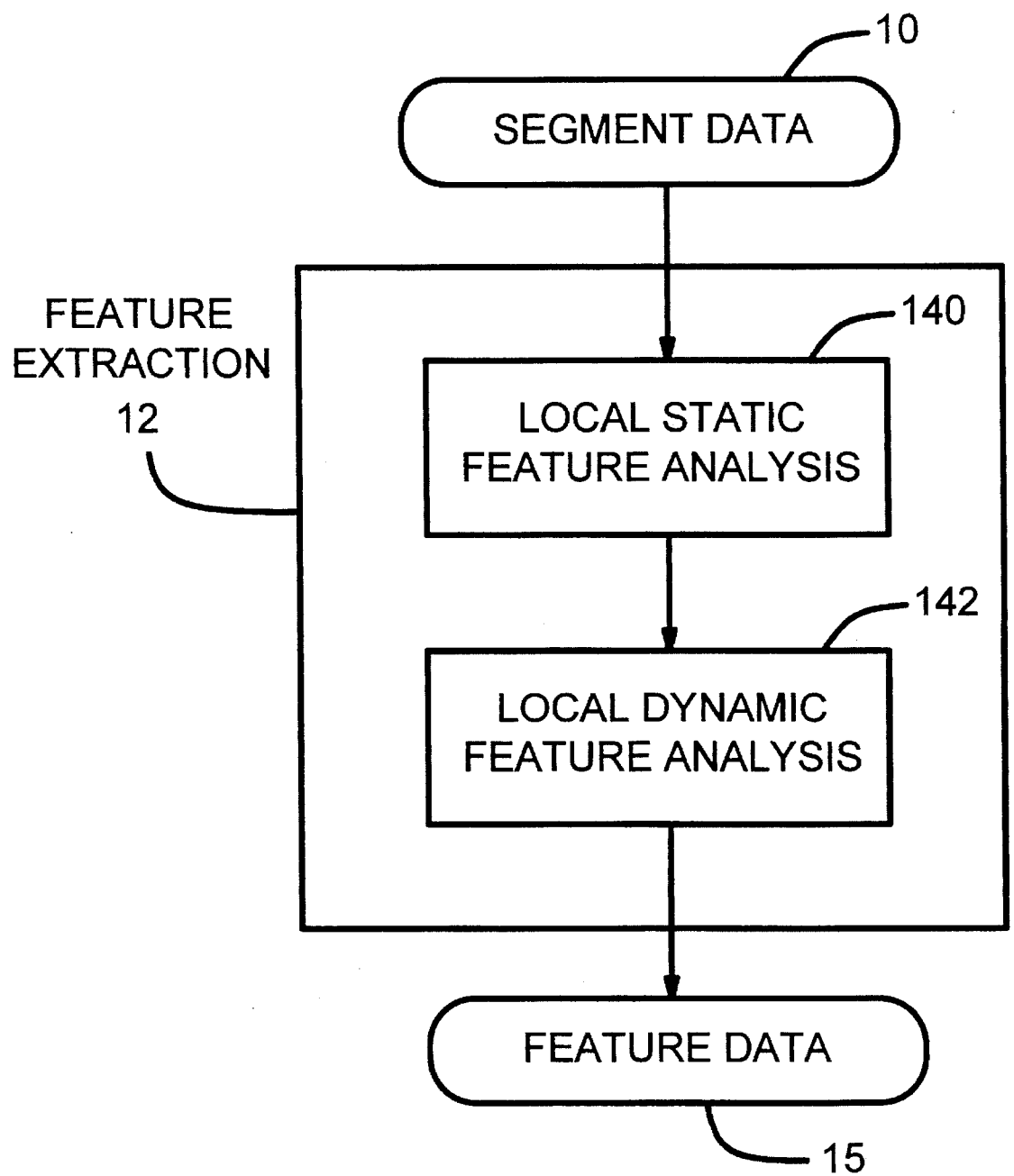
FIG. 9 is a flow chart depicting the process of feature extraction.

Referring back to FIG. 5A, the process of feature extraction 12 is performed on the segment data 10 after pre-processing 8. The purpose of feature extraction 12 is to capture information about how the segments were formed. As shown by FIG. 9, in feature extraction 12 both local static and local dynamic feature analysis 140 and 142, respectively, are performed on the segment data 10 to produce feature data 15.

Local static feature analysis 140 refers to the process of extracting a plurality of physical characteristics, called features, from the segment data 10. Since the features are extracted from one segment at a time, the process is called local static feature analysis. The features extracted from each segment are then represented as a feature vector. After static feature analysis, the process of local dynamic feature analysis is used to group neighboring or adjacent feature vectors together into input frames which form the feature data 15. By combining groups of neighboring feature vectors to form input frames, relationships that exist between neighboring segments of a writing sample (where neighboring segments are often written sequentially in time) are captured and subsequently analyzed during the vector quantization process, hence the name, local dynamic feature analysis. Through local dynamic feature analysis, the relationships that exist between segments forming different parts of a letter or between segments forming different letters may be captured.

The set of features extracted from the segment data during local static feature analysis must embody essential information regarding the actual handwriting sample. In a preferred embodiment of the present invention, local static feature analysis 140 extracts the following set of features from the segment data 10:

1. The net x-distance spanned by segment endpoints.
2. The net y-distance spanned by segment endpoints.
3. The net x-distance spanned by the segment start point and the point halfway in the list of segment data points.
4. The net y-distance spanned by the segment start point and the point halfway in the list of segment data points.
5. An estimate of the speed of motion in the x-direction near the segment endpoint, generated by differentiating the x-coordinates to find the speed of motion at each point, and averaging the speed values for the three-right most points.
6. The total number of segments that would be generated if the multiple-pass zero-crossing segmentation procedure had been applied to the x-coordinate data in the present segment. This procedure counts how many times a stroke changes horizontal direction. (For example, for the letter "s" and the number "8" the total number of segments generated by this segmentation procedure would be three and five, respectively.)
7. The coefficients of a third-order polynomial fitted separately to the x- and y-sample points contained in each segment ($a+bt+ct^2+dt^3$ and $e+ft+gt^2+ht^3$, where t is an arbitrary uniform time-index such as t=0, 1 . . . n).

Including coefficients of fitted polynomials in the set of feature values is motivated by visual inspection of non-uniformly segmented stroke data and the actual net x- and net y- features listed above. Since the actual net x- and net y- features alone fail to capture segment curvature information, polynomial equations are used to characterized the curves formed by the data. Combining net-motion features and coefficients of fitted polynomials supports high fidelity reconstruction of the original data and increases overall recognition performance. Software capable of fitting polynomials to signal data is well-known in the art. Including the polynomial coefficients in the feature values adds eight additional feature values to the first six described above resulting in a total of fourteen values.

During local static feature analysis 140, the static features values listed above, are extracted from each segment of the segment data 10 and are represented by a multidimensional feature vector. Each feature vector is mathematically represented as $F(i)=[V0(i), V1(i), V2(i), V3(i), \ldots, Vn(i)]$; where F stands for feature vector; i is the number of the current segment, Vj for j=0, 2 ... n, represents each type of feature value, and n represents the number of features extracted per segment. For instance, extracting the fourteen feature values described above would result in a fourteen-dimensional feature vector, i.e., $F(i)=[V0(i), V1(i), V2(i) \ldots V13(i)]$. It should be noted, however, that the overall front-end processing framework described herein is independent of the particular set of features chosen and the number of features extracted.

The feature vector notation is shown in step (D) of FIG. 12 which depicts feature vectors 34 generated for the first three segments 120, 122, and 124 of stroke I from the letter "y". The three segments 120, 122, and 124 of stroke I are enumerated with the labels (s−1), (s), (s+1). As shown, corresponding feature vectors 34, labeled F(s−1), F(s), and F(s+1), are created for each segment and each of the feature vectors 34 contains n feature values 36.

Referring back to FIG. 5, after local static feature analysis 140 generates feature vectors for the segment data 10, dynamic feature analysis 142 is performed so that the relationships between neighboring segments' local static features may be measured by vector quantization. This is accomplished by combining neighboring feature vectors into one vector, the input frame 31, as shown in FIGS. 5B and 5C. Combining two or more feature vectors to form an input frame 31 helps to define how certain categories of features change from segment to segment. The advantage of combining more than two feature vectors is that this may also capture some non-linear relationships in the way a particular feature changes that might not be able to be captured calculating a difference between a pair of vectors. For example, the relationship between the two families for a particular feature may be multiplicative rather than linear.

Although any number of feature vectors may be combined to form one vector, in a preferred embodiment, the feature vector for a particular segment is combined with the feature vectors formed from two adjoining segments. The input frame 31 may be represented by a three column matrix, as shown in FIGS. 5B and 5C, where each column in the matrix is a feature vector. More specifically, the middle column (column two) comprises the feature vector for the current segment, column one comprises the feature vector for the segment immediately preceding the current segment, and column three comprises the feature vector for the segment immediately following the current segment. An input frame 31 for every segment in the sequence of segments is created in this manner. Each set of three feature vectors that is combined to form an input frame is referred to as a triple of feature vectors.

As shown in step (D) of FIG. 12, an input frame 31 is formed by concatenating feature vectors F(s−1), F(s), and F(s+1). As described above, a set of input vectors is formed for a sequence of segments in a stroke by stepping the frame having a width of three single vectors through the series of feature vectors that were created from each segment within the stroke. A second input frame for the example in FIG. 12, would comprise the feature vectors F(s), F(s+1), and F(s+2); a third frame would comprise feature vectors F(s+1), F(s+2), and F(s+3); and so on.

The output of local dynamic feature analysis is a sequence of input frames 31 for a handwriting sample. Multiple vector quantization is then performed on the frames to establish, based on processing a statistically-meaningful amount of training data, reliable estimates of the distributions. As discussed above, in vector quantization a more accurate estimate of the distribution of the data results if the dimensionality of the input vector is kept low.

One feature of the present invention is that the input frames 31 described herein keep the dimensionality of the data vector, which is input to the multiple vector quantizer subsystem 6 (FIG. 5A), to a minimum. The low data dimensionality results from forming a series of input frames 31 having low dimensionality, rather than forming one input vector having high dimensionality, by combining every feature vector found within a stroke. For example, since each feature vector in a triple has a dimensionality of fourteen, the resulting input frame 31 has a dimensionality of only forty-two. By comparison, an input vector 31 formed from sixty feature vectors, each having a dimensionality of fourteen, would result in a vector having a dimensionality of 840. Because of the high dimensionality, a complex process called linear discriminate analysis may be performed to produce a vector with a reduced dimensionality. As stated previously, input vectors having a high dimensionality may result in a decrease in data resolution which may affect overall recognition performance. In the present invention, data resolution is enhanced because the output of feature extraction 12 (FIG. 5B) is feature data 15 which is a series of frames 31 comprised of only three feature vectors 34.

Referring back to FIGS. 5B and 5C, after feature extraction 12 the series of input frames 31 comprising the feature data 15 is used during the training phase in the step of multiple vector quantizer design 30, or during the test phase in the step of multiple vector quantization 42. As discussed previously, vector quantization is used to create a condensed statistical representation of the distribution of a set of input vectors. The condensed statistical representation is created by partitioning of the vector distributions in the data space to identify how the vectors cluster or group together. Next, mean locations of the vectors in each cluster are determined as well as the distribution of the vectors about the mean. Typically, vector quantization algorithms allow the vectors to be partitioned into a predetermined number of clusters. After the clusters are determined, a symbol is assigned to each cluster for subsequent identification. The mean locations of the clusters, referred to as reference vectors, and the representative symbols are then stored in a codebook.

In prior art handwriting front-ends, an input frame 31 consisting of a large number of feature vectors 34 is input to a vector quantization algorithm to generate one codebook 18. In the subject invention feature vectors 34 are concatenated with neighboring feature vectors 34 to form an input frame 31, as discussed above. Then, each of the entries of the same type are extracted from the set of feature vectors 34 in the input frame 31 and combined to form feature-specific vectors 40, as shown in FIGS. 5B and 5C. For example, a feature-specific vector 40 is formed for the feature V0 in each of the feature vectors 34 in the input frame 31 by grouping the values V0(1), V0(2), and V0(3) to form a feature-specific vector 40 for this particular feature component 37. The same process is performed for the values V1(1), V1(2), and V1(3); V2(1), V2(2), and V2(3); etc.

Each feature-specific vector 40 within the input frame 31 is then separately quantized to create a codebook 18 for each feature vector component 37. Because each feature-specific vector 40 in the input frame 31 is subjected to vector quantization, the process is termed multiple vector quantization. Multiple vector quantization is not limited to the case where an input frame 31 is comprised of a plurality of feature vectors 34, but also applies in the case where an input frame 31 is comprised of a single feature vector 34.

It should be noted that the present invention is also not limited to generating a codebook 18 for each feature vector component 37; a single codebook 18 may also be generated for a plurality of feature vector components 37. For instance, a single codebook 18 could be generated by grouping the coefficients of the third-order polynomials to form one feature-specific vector 40. For clarity, however, the remaining description explains the present invention in terms of forming one codebook 18 for each feature vector component 37.

After feature-specific vectors 40 are formed, each feature-specific vector 40 is then input to the vector quantizer subsystem 16 to generate a codebook 18 to statistically model how the values for that particular feature are distributed or clustered. During training, a codebook 18 is created from a large set of feature-specific vectors 40 generated from training samples. As feature-specific vectors 40 are input to the vector quantizer, clusters of feature-specific vectors are formed in the data space for the codebook of a particular feature component 37. The mean value of the vectors in each cluster is determined and is referred to as a reference vector. The quantization process also assigns a symbol to each reference vector.

After the codebooks are designed in the training phase, the feature-specific vectors 40 generated from word-independent feature vectors 34, which were extracted from test data, are input to the quantizer and compared with reference vectors in the codebook 18. Each feature-specific vector 40 is then assigned the symbol for the most closely matched reference vector in the codebook 18. In the case where a feature-specific vector 40 is formed from a single feature component 37, the input to the vector quantizer is a three dimensional feature-specific vector 40. Therefore, the data space for a codebook 18 formed from a series of feature-specific vectors 40 is also three dimensional.

Figure 10:
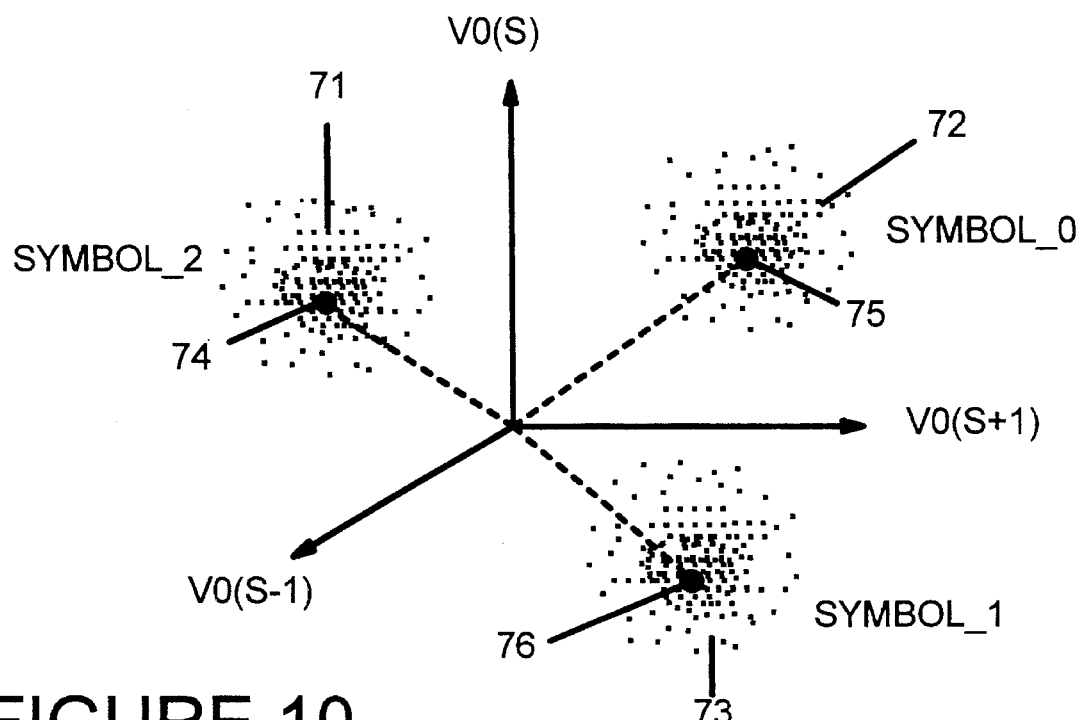
FIG. 10 is a scatter diagram graphically illustrating the data space for a codebook.

FIG. 10 is a scatter diagram graphically illustrating the data space for a codebook 18 for the feature component V0 (FIG. 12). The three axis in the diagram represent dimensions in the data space for the codebook corresponding to the three segments of the current input frame. Since the three values of V0 were extracted from the three feature vectors F(s−1), F(s), and F(s+1) in the input frame, the axis are labeled V0(s−1), V0(s), V0(s+1) where s=1, . . . ,n, and n is the total number of the segments in the stroke. The dots in the diagram represent values of the components V0 of the feature-specific vectors formed from an entire handwriting training set.

As shown, the V0 vectors formed clusters 71, 72, and 73 of data in the data space and reference vectors 74, 75, and 76 located in the center of the clusters 71, 72, and 73, act as representative or mean values. Each of the reference vectors 74, 75, and 76 is associated with a symbol, shown as symbol_0, symbol_1, and symbol_2. Although only three clusters are shown in FIG. 10, it should be noted that data space could be partitioned to form any number of clusters within the data space because the number of clusters formed in the data space is unrelated the dimensionality the feature-specific vector that is input to the vector quantizer.

Step (E) of FIG. 12 depicts the codebooks 18 generated by the multiple vector quantization subsystem 16 (FIG. 5A) for each of the feature-specific vectors 40 corresponding to each feature component. Each feature-specific vector 40 is represented as W(s,i), where s is the segment at the center of the frame, and i (i=0 . . . n) represents the feature component. The first row shown is the feature-specific vector W(s,0) that is formed by grouping the feature value component V0 (the net x- distance spanned by segment endpoints) from the feature vectors 36 for the segments s−1, s, and s+1. The feature-specific vector W(s,0) contains the entries V0(s−1), V0(s), and V0(s+1). Codebook I stores the statistical representation of the vector W(s,0), i.e., the reference vector and associated symbol. The remaining feature-specific vectors 40 formed from the feature vector components are input to the vector quantizer in the same manner and added to the respective codebooks, shown in step (E) as codebooks I through n.

Referring back to FIG. 5C, after the training phase in which the training data is statistically modeled, multiple vector quantization 42 utilizes the codebooks 18 generated during the training phase to effect a reduced representation of an incoming feature-specific vector 40 generated from the test data. Test data that is to be recognized is processed as before. First, pre-processing 8 and feature extraction 12 is performed on the test data to generate word-independent feature vectors 34. Feature-specific vectors 40 are then formed from neighboring feature vectors 34. During multiple vector quantization 42 the distance between each reference vector in a codebook 18 for a feature component 37 and each test-data feature-specific vector 40 for that component 37 is calculated. The quantization process outputs the symbol associated with the reference vector to which the test-data feature-specific vector 40 is the closest in distance.

Figure 11:
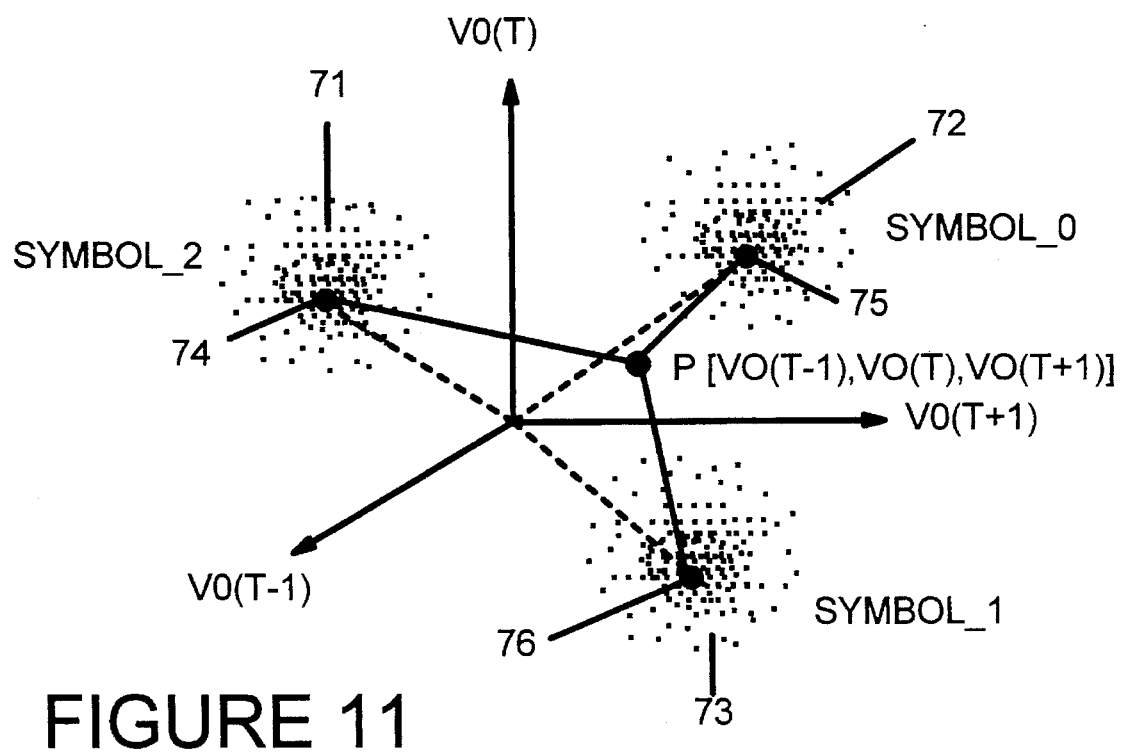
FIG. 11 is a scatter diagram depicting the data space for the codebook for the feature component VO and an input feature-specific vector.

FIG. 11 is a scatter diagram depicting the data space for the codebook of the feature component V0, and a test-data feature-specific vector which has been input to the multiple vector quantizer. Point P represents an input feature-specific vector comprising of the values V0(t−1), V0(t), and V0(t+1) where t−1, t, and t+1 are current segments from test data. The distance between P and each reference vector 74, 75, and 76 is shown by the solid lines extending from P to each reference vector 74, 75, and 76. In this example, P is closest in distance to the reference vector represented by symbol_0, and symbol_0 would be the symbol which is output for the feature-specific vector P.

The number of clusters and reference vectors that a quantization process produces is predetermined by the user. In a preferred embodiment, the multiple vector quantization process is set to produce at the most 256 reference vectors with corresponding symbols for each codebook. Thus each codebook can output symbols that range in value from 0–256. Since 256 values can be represented using six bits, the symbols used to denote the reference vectors are six bit patterns.

Referring back to FIG. 12, steps (A) through (E) of are illustrative of the steps taken during front-end processing both in the training phase and the test phase. However, step (F) is applicable only in the test phase and depicts how codebook symbols are assigned to feature-specific vectors 40, assuming the word "yes" is input as test-data. When a feature-specific vector 40 is quantized within a codebook 18, the feature-specific vector 40 is assigned the value of the symbol of the reference vector to which the feature-specific 40 vector is the closest. Since each codebook 18 contains a plurality of symbols, the symbols are shown as symbol_I(z) through symbol_n(z) where I-n represent a particular codebook and z represents the value of the symbol. As stated above, in a preferred embodiment z would range from 0 to 256. The symbols generated for a particular input frame 31 are then used by the recognizer 20 (FIGS. 5A and 5C) for recognition. The processes of steps (D)–(F) of FIG. 12, are performed for each frame generated for the segments comprising the input strokes.

FIG. 13 graphically depicts the symbols generated in each codebook (I through n) for the input frames produced from the segments forming the letter "y" of FIG. 12. Recall that letter "y" was partitioned into five ordered segments (referenced by the numerals 120, 122, 124, 126 and 128) and that feature vectors formed from these segments were combined as triples to form a series of input frames. Frame 3 consists of feature values extracted from segments 1–3, Frame 4 consists of feature values extracted from segments 2–4, and Frame 5 consists of feature values extracted from segments 3–5.

In a preferred embodiment, the segments falling outside the ends of a stroke are padded with null segments, denoted by "N" in order to properly train the HMMs. For example, Frame 1 is shown as consisting of the feature values extracted from segments N, N, and 1 where 1 represents the first segment in the letter "y", segment 120 (FIG. 12). Since there is no preceding neighboring segments from which feature vectors can be formed, Frame 1 is produced by placing two null feature vectors in the first two columns of the input frame, and placing the feature vector formed from segment 120 in the third column of the input frame. Frame 2 is produced by placing a null segment in the first column the frame, and placing feature vectors for segments 120 and 122 in the second and third positions of the input frame. Similarly, frames 6, and 7 are produced using null segments as pads for the last segments forming of the letter "y".

A separate codebook is produced for each feature-specific vector formed from the feature components. These separate codebooks are shown along the left hand column of the chart in FIG. 13 as codebooks I through n. The symbol values output for each codebook for each frame is shown by the various numbers in the chart. For example, a symbol value of ninety-nine was generated by codebook I for Frame 2.

In terms of effecting a reduced data set for storage and processing, assume that any one segment of handwriting data contains an average of 15 sample points at 6 bytes per point. The segment would consume 90 bytes of storage. Further assume that each segment is represented as a fourteen-dimensional feature vector, and assuming 4 bytes per feature value, results in a 56 byte feature vector for the segment. Once multiple vector quantization is performed on each feature component, the fourteen-dimensional feature vector is represented as the output of fourteen vector quantizers, i.e., one codebook for each feature component. Since the output is represented as a 1 byte symbol (6 bits) for each of the fourteen codebooks, the storage required for the segment is reduced to fourteen bytes from the original 90 bytes.

In a preferred embodiment, the final output of the vector quantization subsystem is a file for each codebook indicating the value generated for each feature value component in each frame. For the example shown in FIG. 13, each row in the chart would be stored as a separate codebook file, and each codebook file would contain seven symbol values, one for each frame. Therefore, in the example of FIG. 12, the (x,y) coordinates that comprised the five segments for stroke I have been reduced to n files each having seven numbers: one file for each codebook with a symbol value for each frame. Strokes having more segments would have more frames. The front-end process produces similar output files for each stroke in the handwriting data.

The front-end processing method of the present invention has been primarily described as operating on stroke-based data. However, the front-end processing method may also operate on imaged-based features. Once features have been extracted from the image data, feature vectors are formed and processed as described above to generate multiple vector quantization codebooks which are used to quantize test handwriting data.

In summary, a handwriting signal processing front-end method has been disclosed which utilizes nonuniform segmentation in combination with feature extraction and multiple vector quantization to produce a significantly reduced representation of handwriting data for uses including recognition, storage, retrieval and transmission. The present method reduces the data dimensionality, thereby increasing data resolution. In addition, the front-end processing method also results in an increase in quantization processing speed due to the small dimensionality of the codebooks, and is therefore suited for real-time applications.

The present invention has been described in terms of a preferred embodiment. The invention, however, is not limited to the embodiment depicted and described. Rather, the scope of the invention is defined by the appended claims. For instance, the software used to implement the present invention is not limited to any type of specific computer hardware platform, although as with most programs, performance may be enhanced with faster hardware processors and increased memory.

What is claimed is:

1. A front-end processing method for a handwriting recognition system, said method for processing strokes of handwriting training samples comprising a time series of (x,y) coordinates, said method comprising the steps of:

segmenting said strokes based on interrelationships of said (x,y) coordinates into an ordered set of training stroke segments that are non-uniform in length for each of said handwriting training samples;

extracting a first plurality of feature values from each of said training stroke segments, wherein each of said feature values extracted therefrom forms entries of a word-independent training feature vector;

creating a series of feature-specific vectors by grouping said entries corresponding to one of said feature values from contiguous groups of said word-independent training feature vectors;

performing multiple vector quantization by vector quantizing each of said feature-specific vectors to statistically characterize said feature-specific vectors, wherein said vector quantizing includes:
partitioning said feature-specific vectors into a plurality of clusters, wherein each of said clusters includes a mean value and a distribution about said mean value for proximate ones of said feature-specific vectors, and
labelling each of said mean values in each of said clusters with a symbol; and storing in a plurality of codebooks said mean values and said symbols for each of said clusters to effect a reduced representation of said handwriting training samples.

2. A method as in claim 1 wherein each of said segments includes a start point, a halfway point, and an endpoint, said segmenting step further including the step of defining said endpoint for each of said segments by calculating a first derivative and a second derivative from said y coordinate-time series data.

3. A method as in claim 2 further including the step of reordering said segments based on said x-coordinate time series data.

4. A method as in claim 3 wherein said plurality of features extracted from said segment include:
- net x- and y-distance between said start point of said segment and said endpoint of said segment;
- net x- and y-distance between said start point of said segment and said halfway point of said segment;
- an estimate of speed of motion in an x-direction at said endpoint of said segment;
- number of segments that are generated when a multiple-pass zero-crossing based segmentation procedure is applied to the x-coordinate data in said segment; and
- coefficients of a third-order polynomial fitted separately to said x-coordinates and y-coordinates in said segment.

5. A method as in claim 1 further including the step of forming an input frame for each of said training stroke segments by combining said contiguous groups of said training feature vectors, and wherein said entries corresponding to one of said feature values are extracted from said training feature vectors in said input frame to form said series of feature-specific vectors.

6. A method as in claim 5 wherein said input frame is formed from three adjacent training feature vectors.

7. A front-end processing method for a handwriting recognition system, said method for processing strokes of handwriting test samples comprising a time series of (x,y) coordinates, wherein said handwriting recognition system has been trained from handwriting training samples including a plurality of feature-specific vectors and codebooks generated therefrom, wherein each of said codebooks is generated for each of said feature-specific vectors, said codebooks comprising mean values and symbols for a plurality of clusters, said method comprising the steps of:
- segmenting said strokes based on interrelationships of said (x,y) coordinates into an ordered set of test stroke segments that are non-uniform in length for each of said handwriting test samples;
- extracting a first plurality of feature values from each of said test stroke segments, wherein each of said feature values extracted therefrom forms entries of a word-independent test feature vector;
- creating a series of test feature-specific vectors by grouping said entries corresponding to one of said feature values from contiguous groups of said word-independent test feature vectors;
- performing multiple vector quantization by vector quantizing each of said test feature-specific vectors to compare each of said test feature-specific vectors to said mean values in said codebooks, wherein said vector quantizing includes assigning to each of said test feature-specific vectors, one of said symbols of one of said mean values to which each of said test feature-specific vectors is closest in distance to form a series of output symbols; and
- using said output symbols to represent said handwriting test samples for recognition of said handwriting test samples.

8. A method as in claim 7 further including the step of forming an input frame for each of said training stroke segments by combining said contiguous groups of said training feature vectors, and wherein said entries corresponding to one of said feature values are extracted from said training feature vectors in said input frame to form said series of feature-specific vectors.

9. A method as in claim 8 wherein said input frame is formed from three adjacent training feature vectors.

10. A front-end processing method for training a handwriting recognizer from a training set of sampled handwriting data comprising a time series of sample points in the form of (x,y) coordinates, said method including the steps of:
- performing non-uniform segmentation on said series of sample points to partition said sample points into a first segment;
- extracting a first feature value and a second feature value from said first segment;
- creating a first word-independent vector from said first and second feature values;
- creating a first feature-specific vector from said first feature value in said first word-independent vector;
- creating a second feature-specific vector from said second feature value in said first word-independent vector;
- performing multiple vector quantization on said first word-independent vector by vector quantizing said first feature-specific vector to form a first cluster, and by vector quantizing said second feature-specific vector to form a second cluster, wherein each of said first and second clusters include a respective mean value and a distribution about said mean value; and
- storing said first cluster in a first codebook and storing said second cluster in a second codebook.

11. A method as in claim 10 further including the steps of:
- grouping said first feature value and said second feature value in said first word-independent vector to form a third feature-specific vector; and
- vector quantizing said third feature-specific vector to form a third cluster.

12. A front-end processing method for training a handwriting recognizer from a training set of sampled handwriting data comprising a series of sample points in the form of (x,y) coordinates, said method including the steps of:
- performing non-uniform segmentation on said series of sample points to partition said sample points into a first and a second segment;
- extracting a first and a second feature value from said first segment, and extracting said first and second feature values from said second segment;
- creating a first word-independent vector from said first and second feature values extracted from said first segment wherein said first and second feature values form entries in said first vector;
- creating a second word-independent vector from said first and second feature values extracted from said second segment wherein said first and second feature values form entries in said second vector;
- combining said first word-independent vector and said word-independent second vector to create an input frame;
- creating a first feature-specific vector by grouping said entries from said first word-independent vector and said second word-independent vector in said input frame corresponding to said first feature value;
- creating a second feature-specific vector by grouping said entries from said first word-independent vector and said second word-independent vector corresponding to said second feature value;
- performing multiple vector quantization on said input frame by vector quantizing said first feature-specific vector to statistically model said first feature-specific vector to create a first codebook, and by vector quantizing said second feature-specific vector to statistically model said second feature-specific vector to form a second codebook; and training said handwriting recognizer using said first and second codebooks.

13. A method as in claim 12 wherein said sampled handwriting data is written on a digitizing tablet using a pen device, said sampled handwriting data recorded as a series of (x,y) coordinates and a pen value indicating whether said pen is up or down, on said digitizing tablet, said non-uniform segmentation including the steps of:

partitioning said sample points into stroke data; removing redundant sample points;

discarding said pen values of up;

normalizing said sampled data;

smoothing said Sampled data using a low-pass filter;

computing the first derivative of said series of (x,y) coordinates to create an x-velocity series and a y-velocity series of said stroke data;

computing the second derivative of said x-velocity series and a y-velocity series to determine acceleration for said stroke data;

partitioning said stroke data into a plurality of segments using said y-velocity series, each one of said segments having an x-coordinate in said stroke data; and reordering said segments based on said x-coordinates to create a series of ordered segments.

14. A front-end processing method for a handwriting recognizer that has been trained using training data represented as a plurality of codebooks to recognize sampled handwriting data in the form of a series of sample points as known strings of characters, each of said codebooks including a plurality of clusters identified by symbols, said method including the steps of:

performing non-uniform segmentation on said series of sample points to partition said sample points into a first and a second segment;

extracting a first and a second feature value from said first segment, and extracting said first and second feature values from said second segment;

creating a first word-independent vector from said first and second feature values extracted from said first segment wherein said first and second feature values form entries in said first word-independent vector;

creating a second word-independent vector from said first and second feature values extracted from said second segment wherein said first and second feature values form entries in said second word-independent vector;

combining said first word-independent vector and said second word-independent vector to create an input frame;

creating a first feature-specific vector by grouping said entries from said first word-independent vector and said second word-independent vector in said input frame corresponding to said first feature value;

creating a second feature-specific vector by grouping said entries from said first word-independent vector and said second word-independent vector corresponding to said second feature value;

performing multiple vector quantization on said input frame by vector quantizing said first feature-specific vector to assign to said first feature-specific vector a first symbol of one of said clusters in one of said codebooks for which said first feature-specific vector is the closest, and by vector quantizing said second feature-specific vector to assign to said second feature-specific vector a second symbol of one of said clusters in one of said codebooks for which said second feature-specific vector is the closest; and sending said first and second symbols to said handwriting recognizer for recognition as said known strings of characters.

* * * * *